(12) United States Patent
Motta et al.

(10) Patent No.: US 8,811,484 B2
(45) Date of Patent: Aug. 19, 2014

(54) VIDEO ENCODING BY FILTER SELECTION

(75) Inventors: Giovanni Motta, San Diego, CA (US);
Marta Karczewicz, San Diego, CA (US); Yan Ye, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1044 days.

(21) Appl. No.: 12/208,269

(22) Filed: Sep. 10, 2008

(65) Prior Publication Data

US 2010/0002770 A1 Jan. 7, 2010

Related U.S. Application Data

(60) Provisional application No. 61/078,642, filed on Jul. 7, 2008.

(51) Int. Cl.
*H04N 7/12* (2006.01)
(52) U.S. Cl.
USPC .................................. 375/240.16; 375/240.01
(58) Field of Classification Search
USPC .......................... 375/240.16, 240.01; 382/236
See application file for complete search history.

(56) References Cited

U.S. PATENT DOCUMENTS

| | | | |
|---|---|---|---|
| 5,021,891 A | 6/1991 | Lee | |
| 5,107,345 A | 4/1992 | Lee | |
| 5,452,104 A | 9/1995 | Lee | |
| 6,128,435 A * | 10/2000 | Galton | 386/241 |
| 6,775,325 B1 * | 8/2004 | Florencio | 375/240.03 |
| 6,950,469 B2 | 9/2005 | Karczewicz et al. | |
| 7,379,501 B2 | 5/2008 | Lainema | |
| 2002/0021752 A1 | 2/2002 | Hannuksela | |
| 2004/0062307 A1 * | 4/2004 | Hallapuro et al. | 375/240.13 |
| 2004/0076333 A1 | 4/2004 | Zhang et al. | |
| 2004/0120401 A1 * | 6/2004 | Linzer et al. | 375/240.16 |
| 2005/0053291 A1 * | 3/2005 | Mishima et al. | 382/236 |

(Continued)

FOREIGN PATENT DOCUMENTS

| | | |
|---|---|---|
| CN | 1615645 A | 5/2005 |
| CN | 1625902 A | 6/2005 |

(Continued)

OTHER PUBLICATIONS

Cho, "Block Adaptive Interpolation Filter using Trained Dictionary for Sub-Pixel Motion Compensation", 2012, IEEE, p. 241-248.*

(Continued)

*Primary Examiner* — Mahfuzur Rahman
*Assistant Examiner* — Gregory Lane
(74) *Attorney, Agent, or Firm* — Bretn A. Boyd

(57) ABSTRACT

A method and a device are described for selecting between multiple available filters in an encoder to provide a frame having a low error and distortion rate. For each full and sub pixel position, determining whether to use an alternative filter over the default filter during interpolation by estimating the rate distortion gain of using each filter and signaling to the decoder the optimal filter(s) applied to each full and sub-pixel position. In one embodiment, identifying a reference frame and a current frame, interpolating the reference frame using a default filter to create a default interpolated frame, interpolating the reference frame using an alternative filter to create an alternative interpolated frame, determining for each sub-pixel position whether to use the default filter or the alternative filter based on a minimal cost to generate a final reference frame.

60 Claims, 9 Drawing Sheets

(56) References Cited

U.S. PATENT DOCUMENTS

| | | | |
|---|---|---|---|
| 2005/0105617 A1 | 5/2005 | Chono | |
| 2006/0114995 A1* | 6/2006 | Robey et al. | 375/240.12 |
| 2006/0294171 A1 | 12/2006 | Bossen et al. | |
| 2007/0009050 A1* | 1/2007 | Wang et al. | 375/240.29 |
| 2007/0120867 A1 | 5/2007 | Shastry et al. | |
| 2007/0183678 A1* | 8/2007 | Sankar et al. | 382/254 |
| 2008/0075165 A1 | 3/2008 | Ugur et al. | |
| 2008/0089417 A1 | 4/2008 | Bao et al. | |
| 2008/0123733 A1* | 5/2008 | Yu et al. | 375/240.01 |
| 2008/0159398 A1* | 7/2008 | Murakami et al. | 375/240.16 |
| 2008/0247467 A1* | 10/2008 | Rusanovskyy et al. | 375/240.16 |
| 2008/0310502 A1* | 12/2008 | Kim et al. | 375/240.02 |
| 2009/0010326 A1* | 1/2009 | Rossholm et al. | 375/240.03 |
| 2009/0202163 A1* | 8/2009 | Romm | 382/236 |

FOREIGN PATENT DOCUMENTS

| | | |
|---|---|---|
| CN | 101141559 A | 3/2008 |
| EP | 1408697 A1 | 4/2004 |
| EP | 1432249 A1 | 6/2004 |
| EP | 1499134 A1 | 1/2005 |
| EP | 1841230 A1 | 10/2007 |
| JP | 2003319398 A | 11/2003 |
| JP | 2004147328 A | 5/2004 |
| KR | 100660358 B1 | 12/2006 |
| RU | 2302707 C2 | 7/2007 |
| RU | 2317654 C2 | 2/2008 |
| WO | WO2006108654 A2 | 10/2006 |
| WO | WO2008038238 A2 | 4/2008 |
| WO | 2009047917 A1 | 4/2009 |

OTHER PUBLICATIONS

TIA-1099, Forward Link Only Air Interface Specification for Terrestrial Mobile Multimedia Multicast, Mar. 2007.

International Search Report and Written Opinion—PCT/US2009/048829, International Searching Authority—European Patent Office, Nov. 10, 2009.

Kazushi Sato et al: "Adaptive MC Interpolation Filter for Complexity Reduction" ISO/IEC JTC1/SC29/WG11 MPEG99/M5583, XX, XX, No. JVT-0052, May 6, 2002, pp. 1-6, XP002333588, paragraphs [0001]-[0003].

Kun Su Yoon et al: "Macroblock-based adaptive interpolation filter method using new filter selection in H.264/AVC" Multimedia Signal Processing, 2008 IEEE 10th Workshop on, IEEE, Piscataway, NJ, USA, Oct. 8, 2008, pp. 409-412, XP031356665 ISBN: 978-1-4244-2294-4, paragraphs [0III]; figures 1,2.

Miyamoto: "Adaptive Motion Interpolation on MB-basis" Joint Video Team (JVT) of ISO/IEC MPEG & ITU-T VCEG(ISO/IEC JTC1/SC29/WG11 and ITU-T SG16 Q6), XX, XX, No. JVT-C040, May 10, 2002, XP030005148.

Vatis Y et al: "Motion-and Aliasing-Compensated Prediction Using a Two-Dimensional Non-Separable Adaptive Wiener Interpolation Filter" Image Processing, 2005. ICIP 2005. IEEE International Conference on Genova, Italy Sep. 11-14, 2005, Piscataway, NJ, USA, IEEE, vol. 2, Sep. 11, 2005, pp. 894-897, XP010851198 ISBN: 978-0-7803-91 34-5.

Vatis, Y. et al: "Prediction of P- and B-Frames Using Two-Dimensional Non-Separable Adaptive Wiener Interpolation Filter for H.264/AVC" Joint Video Team (JVT) of ISO/IEC MPEG & ITU-T VCEG(ISO/IEC JTC1/SC29/WG11 and ITU-T SG16 Q6), XX, XX, No. VCEG-AD08, Oct. 29, 2006, XP030003499.

Wedi T: "Adaptive interpolation filters and high-resolution displacements for video coding" IEEE Transactions on Circuits and Systems for Video Technology, IEEE Service Center, Piscataway, NJ, US, vol. 16, No. 4, Jan. 4, 2006, pp. 484-491, XP002464225.

Yuri Vatis et al: "Locally Adaptive Non-Separable Interpolation Filter for H.264/AVC" Image Processing, 2006 IEEE International Conference on, IEEE, PI, Oct. 1, 2006, pp. 33-36, XP031048566 ISBN: 978-1-4244-0480-3.

Wedi T., "Adaptive Interpolation Filter for Motion Compensated Hybrid Video Coding", Picture Coding Symposium (PCS 2001), Seoul, Korea, Apr. 2001.

Qualcomm: "Switched Interpolation Filter with Offset" ITU-T SG16/Q.6 Doc. T05-SG-C 463-E, International Telecommunication Union, Geneva, CH, Apr. 14, 2008, pp. 1-4, XP007908845.

Taiwan Search Report—TW098122826—TIPO—Aug. 29, 2012.

Ugur K. et al., "Adaptive Interpolation Filter with Flexible Symmetry for Coding High Resolution High Quality Video", Acoustics, Speech and Signal Processing, 2007. ICASSP, 2007 IEEE International Conference on vol. 1, Apr. 15-20, 2007, pp. 1-1013.

* cited by examiner

VIDEO ENCODING BY FILTER SELECTION

RELATED APPLICATIONS

This application claims priority to U.S. Provisional Application 61/078,642, filed on Jul. 7, 2008, the contents of which are hereby incorporated by reference in their entirety.

BACKGROUND

1. Field of the Invention

This application relates to video encoding, more specifically, to techniques for interpolating reference frames in video compression systems.

2. Description of the Related Art

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. These and other digital video devices can provide significant improvements over conventional analog video systems in creating, modifying, transmitting, storing, recording and playing full motion video sequences.

A number of different video encoding standards have been established for communicating digital video sequences. The Moving Picture Experts Group (MPEG), for example, has developed a number of standards including MPEG-1, MPEG-2 and MPEG-4. Other standards include ITU H.263, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. These and other standards, including standards yet to be developed, will continue to evolve.

Video encoding standards achieve increased transmission rates by encoding data in a compressed fashion. Compression can reduce the overall amount of data that needs to be transmitted for effective transmission of image frames. The MPEG standards, for example, utilize graphics and video compression techniques designed to facilitate video and image transmission over a narrower bandwidth than could be achieved without the compression. In particular, the MPEG standards incorporate video encoding techniques that utilize similarities between successive image frames, referred to as temporal or inter-frame correlation, to provide inter-frame compression. The inter-frame compression techniques exploit data redundancy across frames by using motion compensated prediction, i.e. by predicting a frame from another after estimating the motion of the scene. In addition, the video encoding techniques may utilize similarities within image frames, referred to as spatial or intra-frame correlation. Frame compression is typically based upon conventional processes for compressing still images, such as discrete cosine transform (DCT) encoding. Discrete cosine transform (DCT) encoding is also used to compress the motion compensated prediction.

One DCT technique is known as the Adaptive Block Size Discrete Cosine Transform (ABSDCT) method. This technique is disclosed in U.S. Pat. No. 5,021,891, entitled "Adaptive Block Size Image Compression Method And System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Differential Quadtree Transform technique is discussed in U.S. Pat. No. 5,452,104, entitled "Adaptive Block Size Image Compression Method And System," also assigned to the assignee of the present invention and incorporated herein by reference. The systems disclosed in these patents utilize what is referred to as "intra-frame" encoding, where each frame of image, data is encoded without regard to the content of any other frame. Using the ABSDCT technique, the achievable data rate may be reduced from around 1.5 billion bits per second to approximately 50 million bits per second without discernible degradation of the image quality.

The ABSDCT technique may be used to compress either a black and white or a color image or signal representing the image. The color input signal may be in a YIQ format, with Y being the luminance, or brightness, sample, and I and Q being the chrominance, or color, samples for each 4.times.4 block of pixels. Other known formats such as the YUV, $YC_{b}C_{y}$ or RGB formats may also be used. Because of the low spatial sensitivity of the eye to color, most research has shown that a sub-sample of the color components by a factor of four in the horizontal and vertical directions is reasonable. Accordingly, a video signal may be represented by four luminance components and two chrominance components.

To support the compression techniques, many digital video devices include an encoder for compressing digital video sequences, and a decoder for decompressing the digital video sequences. In many cases, the encoder and decoder comprise an integrated encoder/decoder (CODEC) that operates on blocks of pixels within frames that define the sequence of video images. In the MPEG-4 standard, for example, the encoder of a sending device typically divides a video image frame to be transmitted into macroblocks comprising smaller image blocks. For each macroblock in the image frame, the encoder searches macroblocks of the immediately preceding video frame to identify the most similar macroblock, and encodes the difference between the macroblocks for transmission, along with a motion vector that indicates which macroblock from the previous frame was used for encoding. The decoder of a receiving device receives the motion vector and encoded differences, and performs motion compensation to generate video sequences. Motion vectors may have full, half or quarter pixel precisions, depending on the level of precision selected by an encoder. When motion vectors with fractional pixel values are used, a better prediction block is obtained. Interpolation is carried out to determine the values of the fractional pixels (sub-pixels). In one example, pixel values include bits representing the intensity of a luminance, chrominance, or color component.

The video encoding process is computationally intensive. In particular, the process of comparing video blocks to previously transmitted video blocks requires large numbers of computations. Improved encoding techniques are highly desirable, particularly for use in wireless devices or other portable video devices where computational resources are more limited and power consumption is a concern.

SUMMARY

One embodiment is a method of encoding digital video, the method including; identifying a reference frame and a current frame, interpolating the reference frame using a default filter to create a default interpolated frame, interpolating the reference frame using an alternative filter to create an alternative interpolated frame, determining for each sub-pixel position whether to use the default filter or the alternative filter based on a lower sum error to generate a final reference frame.

Another embodiment is a video encoding device, including; a motion compensation unit configured to interpolate a first reference frame using a default filter to create a default interpolated frame and configured to interpolate a second reference frame using an alternative filter to create an alternative interpolated frame, a reference frame store configured to store the default interpolated frame and store the alternative interpolated frame, a filter decision unit configured to receive a current frame, receive the default interpolated frame, receive the alternative interpolated frame, and determine, for each full and sub-pixel position, whether to use a default filter or an alternative filter in a final frame; and generate the final frame.

Still another embodiment is a video encoding device, including; a means for receiving a current frame, a means for storing a plurality of interpolated reference frames in a reference frame store, a means for receiving the plurality of interpolated reference frames from the reference frame store, a means for producing a final frame, and a means for determining for each full and sub pixel position in the final frame whether to use a default filter or an alternative filter.

One other embodiment is a video encoding device, including: a motion compensation unit configured to interpolate a first reference frame using a default filter to create a default interpolated frame and configured to interpolate a second reference frame using an alternative filter to create an alternative interpolated frame, a filter decision unit configured to receive a current frame, receive the default interpolated frame, receive the alternative interpolated frame, determine, for each full and sub-pixel position, whether to use a default filter or an alternative filter in a final frame, and generate the final frame.

Another embodiment is a video encoding device, including; a means for receiving a current frame, a means for receiving a plurality of interpolated reference frames, a means for producing a final frame, and means for determining for each full and sub pixel position in the final frame whether to use a default filter or an alternative filter.

BRIEF DESCRIPTION OF THE DRAWINGS

The foregoing aspects and many of the attended advantages of this application are illustrated by way of example, and not by way of limitation, in the accompanying drawings, wherein.

DETAILED DESCRIPTION

Figure 1:
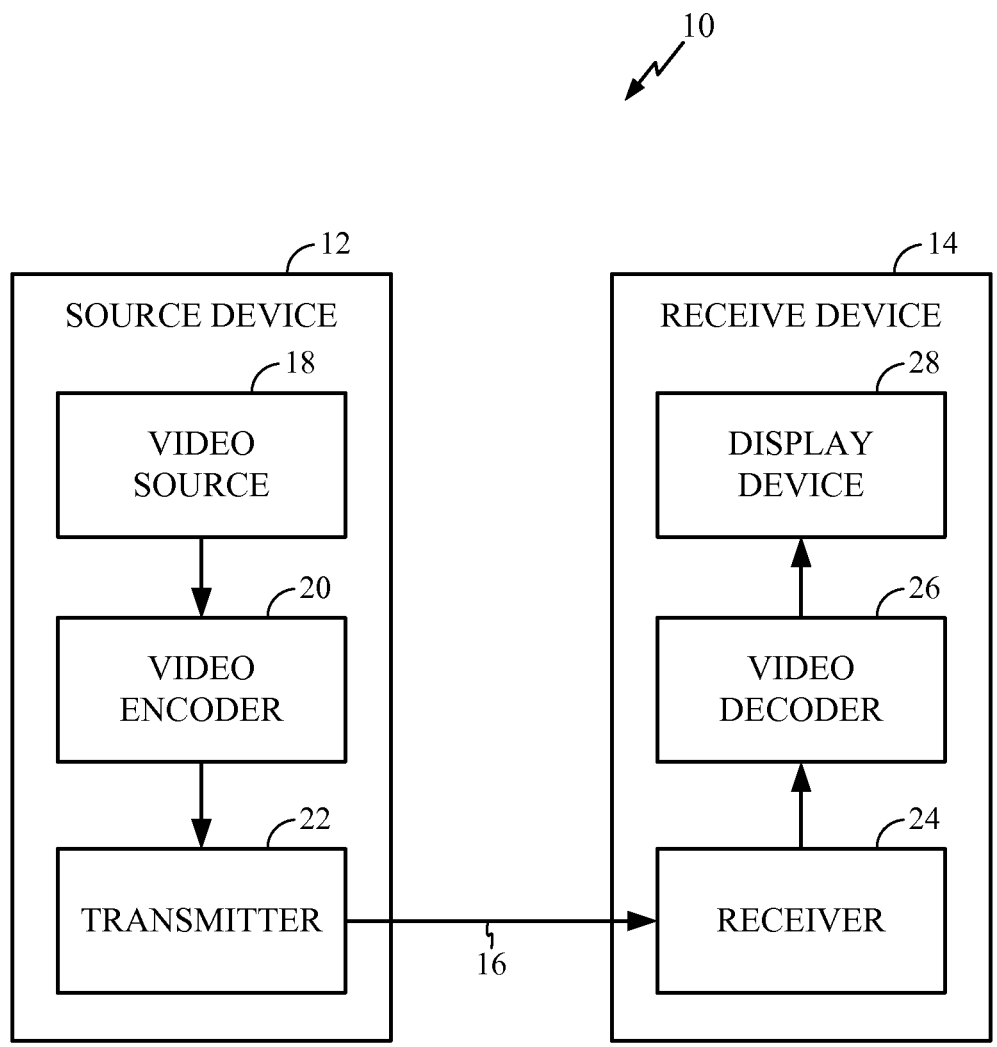
FIG. 1 is a block diagram illustrating a video encoding and decoding system.

Specific embodiments of the application will now be described with reference to the drawings. The terminology used in the description presented herein is not intended to be interpreted in any limited or restrictive manner, simply because it is being utilized in conjunction with a detailed description of certain specific embodiments of the application.

In one embodiment, the system interpolates a given block or frame of video using a plurality of filters to create multiple reference frames. For each filter, the system then calculates motion vectors from the given reference frame. A calculation is then made to determine, for each pixel, which filter provided the lowest error and distortion rate. In some embodiments, the expected performance of one or a combination of filters for each sub-pixel and integer pixel within a video frame is examined. Then, the best filter for encoding the sub-pixel and integer pixel values is selected for each position in the video frame.

In one embodiment, the system accumulates the sum of absolute difference (SAD) error measurements for all available positions in a single frame, using a plurality of filters. By measuring the SAD, the system can determine whether it's advantageous to use an adaptive filter (for example, an adaptive interpolation filter (AIF)) corresponding to that position or whether it may be more convenient (in terms of SAD and weighted bit cost) to use a default interpolation filter, or use no filter at all to encode the pixel values.

In another embodiment, a process of using optimal selection criteria for a combination of available filters leading to a minimal computational cost (or SAD plus weighted encoding bits used by non-default interpolation filters) is used. Given a matrix and a vector, it may be possible to computer the error corresponding to each of the decision vectors and select the filter for each sub-pixel position indicating the minimal computational cost.

In still another embodiment, an iterative process is utilized. This process includes starting from a possible solution (any valid decision vector) and finding the position for which an alternative filter provides the biggest error decrease. This new position is then updated with the value of the new filter choice and the process is repeated until no more improvements are possible, the improvements are negligible (below a predetermined threshold), or a maximum number of iterations is reached.

In still another embodiment, a simplified heuristic is used to find an approximation of the minimal cost using symmetry classes. This method considers only error contributions in which the positions of two references blocks use the same filer. This happens when the positions are identical or when they belong to the symmetry class.

In another embodiment, a quantization table is used that improves the encoding of the filter coefficients used on the full-pixel positions, wherein the quantization precision depends on the coefficient location using an uneven quantization process.

Block matching is the most common method of motion estimation. Typically each macroblock (i.e. 16×16 pixels) in a video frame is compared with shifted regions of the same size from a previous frame, and the shift which results in the minimum error is selected as the best motion vector for that macroblock.

Intra-frames (or I-frames) are frames coded without reference to any other frame, and may be generated by an encoder to create a random access point. Intra-frames typically require more bits to encode than other picture types. Often, I-frames are used for random access and are used as references for decoding of other frames.

Predicted frames (or P frames) require the prior decoding of some other frames(s) in order to be decoded and may contain both image data and motion vector displacements. In H.264, predicted frames can use multiple previously-decoded frames as references during decoding, and may have any arbitrary display-order relationship relative to the frames(s) used for its prediction. Also, typically, predicted frames require fewer bits for encoding than intra-frames do.

Bi-directional predicted frames (or B frames) require the prior decoding of some other frame(s) in order to be decoded, may contain both image data and motion vector displacements, and include some prediction modes that form a prediction by averaging the predictions obtained using two different previously-decoded reference regions. In H.264, bi-directional predicted frames may or may not be used as references for the decoding of other pictures. B frames typically require fewer bits for encoding than either intra-frames or predicted frames do.

FIG. 1 is a block diagram illustrating a video encoding and decoding system 10. As shown in FIG. 1, system 10 includes a source device 12 that transmits encoded video to a receive device 14 via a communication channel 16. Source device 12 may include a video source 18, video encoder 20 and a transmitter 22. The transmitter 22 may be a wired/wireless transmitter. Receive device 14 may include a receiver 24, video decoder 26 and video display device 28. In some aspects, receiver 24 may be a wireless receiver, such as a wireless receiver in a wireless communication device handset. System 10 may be configured to support alternative filtering (or adaptive filtering) of motion compensated prediction blocks to improve both visual quality and processing efficiency.

In the example of FIG. 1, communication channel 16 may comprise any wireless or wired communication medium, such as a radio frequency (RF) spectrum or one or more physical transmission lines, or any combination of wireless and wired media. Channel 16 may form part of a packet-based network, such as a local area network, wide-area network, or a global network such as the Internet. Communication channel 16 generally represents any suitable communication medium, or collection of different communication media, for transmitting video data from source device 12 to receive device 14.

Source device 12 generates video for transmission to destination device 14. In some cases, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video broadcasting, or video telephony.

Video source 18 may include a video capture device, such as one or more video cameras, a video archive containing previously captured video, or a live video feed from a video content provider. As a further alternative, video source 18 may generate computer graphics-based data as the source video, or a combination of live video and computer-generated video. In some cases, if video source 18 is a camera, source device 12 and receive device 14 may form so-called camera phones or video phones, including satellite or mobile wireless telephones, or other wireless communication devices. Hence, in some aspects, the techniques described in this application may be implemented within a mobile wireless communication device handset, such as a mobile telephone handset. In each case, the captured, pre-captured or computer-generated video may be encoded by video encoder 20 for transmission from video source device 12 to video decoder 26 of video receive device 14 via transmitter 22, channel 16 and receiver 24. Display device 28 may include any of a variety of display devices such as a liquid crystal display, (LCD), plasma display or organic light emitting diode (OLED) display.

Video encoder 20 and video decoder 26 may be configured, in some aspects of this application, to support scalable video coding for spatial, temporal and/or signal-to-noise ratio (SNR) scalability. Encoder 20 and decoder 26 may support various degrees of scalability by supporting encoding, transmission and decoding of a base layer and one or more scalable enhancement layers. For scalable coding, a base layer carries video data with a minimum level of quality. One or more enhancement layers carry additional bitstream to support higher spatial, temporal or SNR levels.

Video encoder 20 and video decoder 26 may operate according to a video compression standard, such as MPEG-2, MPEG-4, ITU-T H.263, or ITU-T H.264/MPEG-4, Part 10 (AVC). Although not shown in FIG. 1, in some aspects, video encoder 20 and video decoder 22 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264 standard was developed by the ITU-T Video Coding Experts Group and the ISO/IEC Moving Picture Experts Group (MPEG), as the product of a partnership known as the Joint Video Team (JVT). The H.264 standard is described in ITU-T Recommendation H.264, Advanced Video coding for Generic Audiovisual. Services, dated March 2005, which may be referred to herein as the H.264 standard or H.264 specification, or the H.264/AVC standard or specification. In some aspects, techniques described in this application may be applied to devices that generally conform to the H.264 standard, or other devices that do not generally conform to the H.264 standard.

The Joint Video Team (JVT) continues to work on a scalable video coding (SVC) extension to H.264/MPEG-4 AVC. The specification of both H.264/MPEG-4 AVC and the evolving SVC extension are in the form of a Joint Draft (JD). The Joint Scalable Video Model (JSVM) created by the JVT implements tools for use in scalable video, which may be used within system 10 for various coding tasks described in this application.

In some aspects, for video broadcasting, embodiments relate to an application to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital media broadcast). Hence, in some cases, source device 12 may be a mobile wireless terminal, such as a wireless communication device handset, a video streaming server, or a video broadcast server. However, the techniques described in this application are not limited to any particular type of broadcast, multicast, or point-to-point system.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Hence, the techniques described herein may be implemented within one or more integrated circuit devices, which may be referred to collectively as an integrated circuit device. Such an integrated circuit device may be provided within a communication device, such as a wireless communication device handset. Each of video encoder 20 and video decoder 26 may be included in one or more encoders or decoders, either of which may be integrated as part of a combined encoder/decoder (CODEC) in a respective mobile device, subscriber device, broadcast device, server, or the like. In addition, video source device 12 and video receive device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are not shown in FIG. 1.

As mentioned above, videos includes a series of video frames. Video encoder 20 operates on blocks of pixels within individual video frames in order to encode the video data. The video blocks may have fixed or varying sizes, and may differ in size according to a specified coding standard. As an example, the ITU-T H.264 standard supports intra prediction in various block sizes, such as 16×16, 8×8, 4×4 for luma components, and 8×8 for chroma components. The ITU-T H.264 standard also supports, inter prediction in various block sizes, such as 16×16, 16×8, 8×16, 8×8, 8×4, 4×8 and 4×4 for luma components and corresponding scaled sizes for chroma components. Smaller video blocks can provide better resolution, and may be used for locations of a video frame that include higher levels of detail. In general, macroblocks and the various smaller blocks may be considered to be video blocks. In some cases, the smaller blocks may be referred to as sub-blocks. After prediction, a transform may be performed on the 8×8 residual block or 4×4 residual block. Also, an additional transform may be applied to the DC coefficients of the 4×4 blocks for chroma components or luma component if the intra sub—16×16 prediction mode is used.

Figure 2:
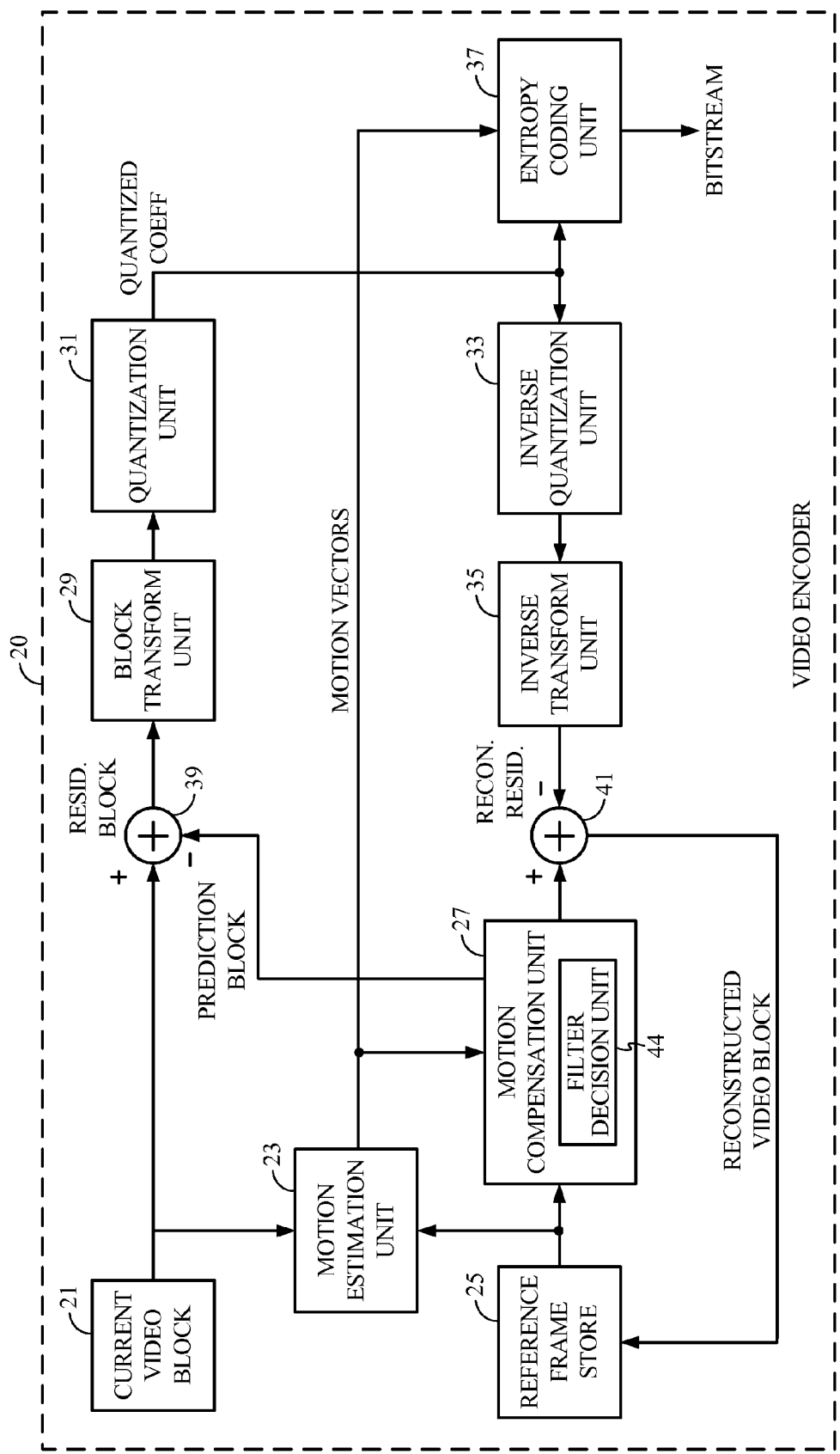
FIG. 2 is a block diagram illustrating a video encoder.

FIG. 2 is a block diagram illustrating more details of the video encoder 20. Video encoder 20 may perform intra- and inter-coding of blocks within video frames. Intra-coding relies on spatial prediction to reduce or remove spatial redundancy in a given video frame. Inter-coding relies on temporal prediction to reduce, or remove, temporal redundancy in video within adjacent frames. For inter-coding, video encoder 20 performs motion estimation to track the movement of matching video blocks between two or more adjacent frames.

As shown in FIG. 2, video encoder 20 receives a current video block 21 within a video frame to be encoded. In the example of FIG. 2, video encoder 20 includes motion estimation unit 23, reference frame store 25, motion compensation unit 27, block transform unit 29, quantization unit 31, inverse quantization unit 33, inverse transform unit 35 and entropy coding unit 37. Video encoder 20 also includes summer 39 and summer 41. FIG. 2 illustrates the temporal prediction components of video encoder 20 for inter-coding of video blocks. Although not shown in FIG. 2 for ease of illustration, video encoder 20 also may include spatial prediction components for intra-coding of some video blocks.

Motion estimation unit 23 compares video block 21 to blocks in one or more adjacent video frames to generate one or more motion vectors. The adjacent frame or frames may be retrieved from reference frame store 25. Motion estimation may be performed for blocks of variable sizes, e.g., 16×16, 16×8, 8×16, 8×8 or smaller block sizes. Motion estimation unit 23 identifies a block in an adjacent frame that most closely matches the current video block 21, e.g., based on a rate distortion model, and determines a displacement between the blocks. On this basis, motion estimation unit 23 produces a motion vector that indicates the magnitude and trajectory of the displacement.

Motion vectors may have half-pixel or quarter-pixel precision, or even finer precision, allowing video encoder 20 to track motion with higher precision than integer pixel locations and obtain a better prediction block. When motion vectors with fractional pixel values are used, interpolation operations may be carried out in motion compensation unit 27. For example, in the H.264/AVC standard, to obtain a luma signal at half-pixel positions, the 6-tap Wiener filter with coefficients (1, −5, 20, 20, −5, 1)/32 may be used. To obtain luma signals at quarter-pixel locations, bilinear filtering on the values at integer pixel locations and the interpolated values at half pixel locations may be used. The bilinear filter also may be used in fractional pixel interpolation for the chroma components, which may have up to ⅛-pixel precision.

Motion estimation unit 23 identifies the best motion vector for a video block using a rate-distortion model. Using the resulting motion vector, motion compensation unit 27 forms a prediction video block by motion compensation. Video encoder 20 forms a residual video block by subtracting the prediction video block produced by motion compensation unit 27 from the original, current video block 21 at summer 39. Block transform unit 29 applies a transform to the residual block. Quantization unit 31 quantizes the transform coefficients to further reduce bit rate. Entropy coding unit 37 entropy codes the quantized coefficients to even further reduce bit rate. Video decoder 26 performs inverse operations to reconstruct the encoded video.

Inverse quantization unit 33 and inverse transform unit 35 apply inverse quantization and inverse transformation, respectively, to reconstruct the residual block. Summer 41 adds the reconstructed residual block to the motion compensated prediction block produced by motion compensation unit 27 to produce a reconstructed video block (or a filter decision for a current frame) for storage in reference frame store 25. The motion compensation unit comprising a filter decision unit 44 configured to receive reference frames from the reference frame store 25, receive a current frame, and produce a reconstructed video block to be stored in the filter reference frame store 25. The reconstructed video block may be used by motion estimation unit 23 and motion compensation unit 27 to encode a block in a subsequent video frame.

When performing motion compensation for a given block in the current video frame 21, motion compensation unit 27 may use a fixed set of filters to interpolate a reference block from a reference frame. One reference block is needed if the current block is uni-directionally predicted or two reference blocks are needed if the current block is bi-directionally predicted. In H.264, multiple reference frames in forward and backward directions may be used in some cases. The actual filters used by motion compensation unit 27 depend on the fractional part of the motion vector. For example, if the motion vector points to a half-pixel location in the reference frame in a given dimension, to obtain the value of the half-pixel location, a default interpolation filter may be used in that dimension with a half-pixel motion vector. If both motion vector components point to integer locations, the pixel values from the reference frame in reference frame store 25 may be used directly without performing any interpolation filtering operation.

Figure 3:
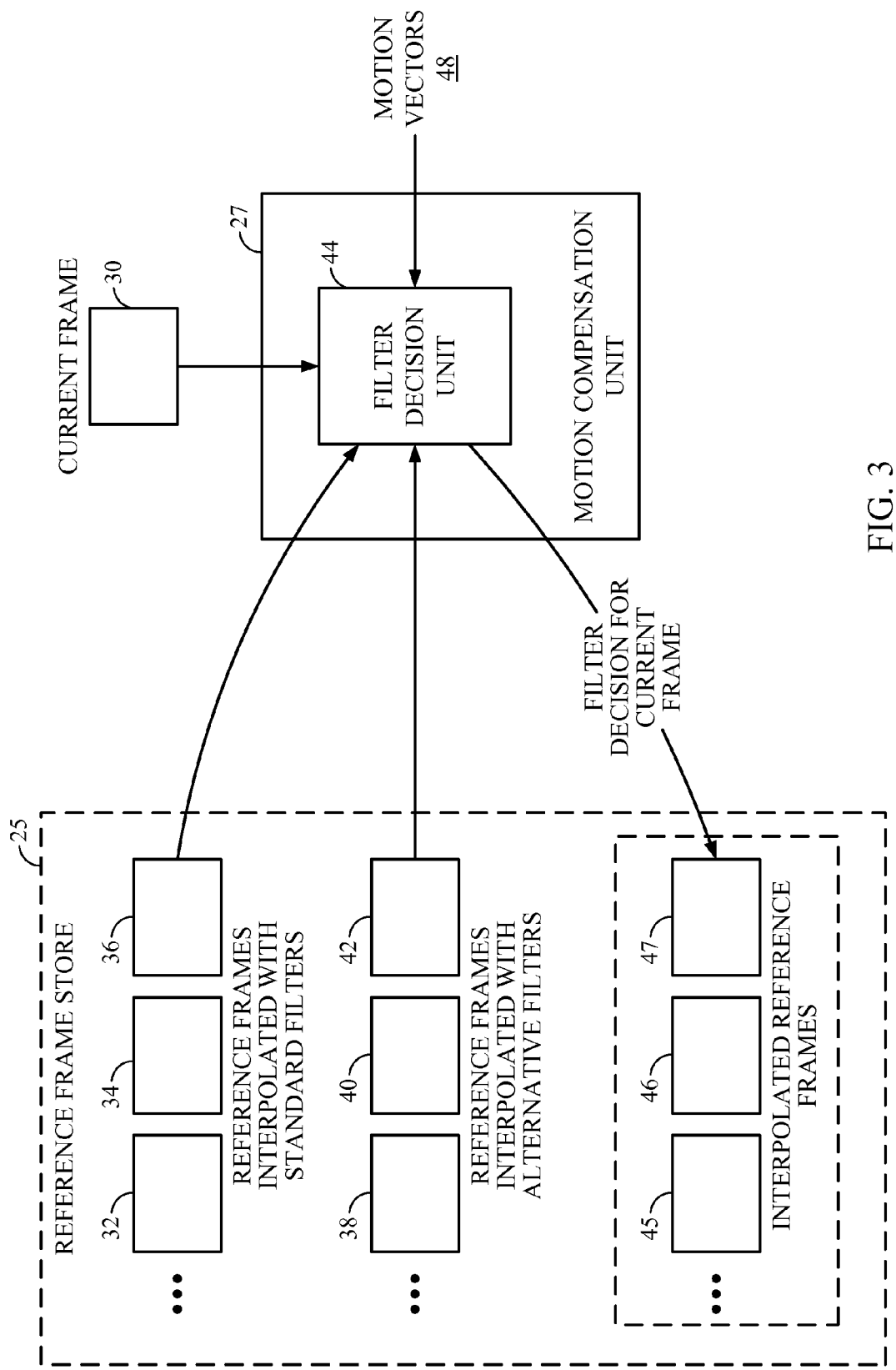
FIG. 3 is a block diagram illustrating a reference frame store and a filter decision unit.

FIG. 3 is a block diagram illustrating a reference frame store 25 and a filter decision unit 44 as shown in FIG. 2. The illustrative block diagram of the reference frame store 25 and filter decision union 44 of FIG. 3 includes a current frame 30, a reference frame store 25, and a filter decision unit 44. The current frame 30 may be transmitted to the filter decision unit 44 to be used to create a final (or reconstructed) reference frame to be stored in the reference frame store 25. The reference frames store 25 may maintain a set of reference frames and transmit the maintained reference frames to the motion compensation unit 27. In one embodiment, a set of reference frames interpolated with default filers 32, 34, and 36 are stored in the reference frame store 25 and are sent to the filter decision unit 44. In another embodiment, a set of reference frames interpolated with alternative filters (or non-default filters) 38, 420, 42 are stored in the reference frame store 25 and sent to the filter decision unit 44. In another embodiment, if memory capacity is limited, interpolated frames may be generated on-the-fly, as needed. In one embodiment, the interpolated frames are generated in real-time as long as the original (non-interpolated) frames, the interpolating filters and the filter choices are available. The alternative filter (not shown) residing in a video encoder 20 may be an adaptive interpolation filter, a separable adaptive interpolation filter, a fixed filter. In another embodiment, an alternative filter may an adaptive interpolation filter (AIF) that offers large coding gains, especially on video sequences with high resolution (e.g. 720p). The video encoder 20 has a fixed set of alternative filters to interpolate a block in a reference frame. In yet another embodiment, the video encoder 20 may support a 2D non-separable adaptive interpolated filter, a separable adaptive interpolated filter, a directional adaptive interpolated filter, and an enhanced adaptive interpolated filter. A 2D non-separable adaptive interpolation filter uses a two dimensional matrix to interpolate frames. A separable adaptive interpolation filter uses vertical then horizontal scans to interpolate frames. A directional adaptive interpolation filter uses diagonal scans to interpolate frames.

In another embodiment, an enhanced adaptive interpolation filter (E-AIF) may be used by adding a full-pixel position filter and a filter offset to each full- and sub-pixel position. For the full and each sub-pixel position E-AIF also estimates the expected rate distortion gain of the alternative filter over the default interpolation and decides whether to use and signal to the decoder the alternative filter or not.

The filter decision unit 44 may compare the sum bit overhead (or cost) of encoding the received current frame 30 using reference frames interpolated with default filter 32, 34, 36 and reference frames interpolated with alternative filters 38, 40, 42. In one embodiment, the filter decision unit 44 may uses a scaling factor (not shown) to reconstruct the pixel positions to determines the absolute error corresponding to the use of either the default filters or the alternative filters. In another embodiment, the filter decision unit 44 may compare the absolute error value for each pixel, select between available filter, and produces a decision vector that minimizes bit error rate and distortion.

The filter decision unit 44 may also receive motion vectors (or motion vector data) 48. In one embodiment, the filter decision unit may receive the current frame 30, the motion vectors 48, interpolated reference frames, such as reference frames interpolated with a default filter 32, 34, 36 and reference frames interpolated with an alternative filter 38, 40, 42 in order to create a final (or reconstructed) reference frames 45, 46, 47 to be stored in the reference frame store 25. As a result, the filter decision unit 44 provides interpolated reference frames 45, 46, and 47, wherein each full or sub-pixel is interpolated using either a default or alternative filter. In another embodiment, the filter decision unit 44 may output to the reference frame store 25 a decision array (not shown). The decisions array (not shown) may provide decision values describing the reconstructed reference frames 45, 46, 47. In one embodiment, the decision values provided by the decision array (not shown) may be, for example, [a (1), b (0), c (1), d (0) . . . ]; wherein a sub-pixel position is identified by an alpha character and a filter selection decision is identified in binary (0 or 1) format as either using the default or the alternative filter available the video encoder 20. In another embodiment, the decision values provided by the decision array may be for example, [a(1), b(2), c(3), d(4), . . . ], wherein a sub-pixel position is identified by an alpha character and a filter selection decision is identified using a number format used to identify the actual filter type to be used per sub-pixel position. In one embodiment, multiple default and multiple adaptive interpolation filters may be compared against one another in order to determine the most efficient filter for encoding each sub-pixel position. In another embodiment, multiple adaptive interpolation filters are compared against one another in order to determine the most efficient adaptive filter to be applied during encoding for each sub-pixel position.

Figure 4:
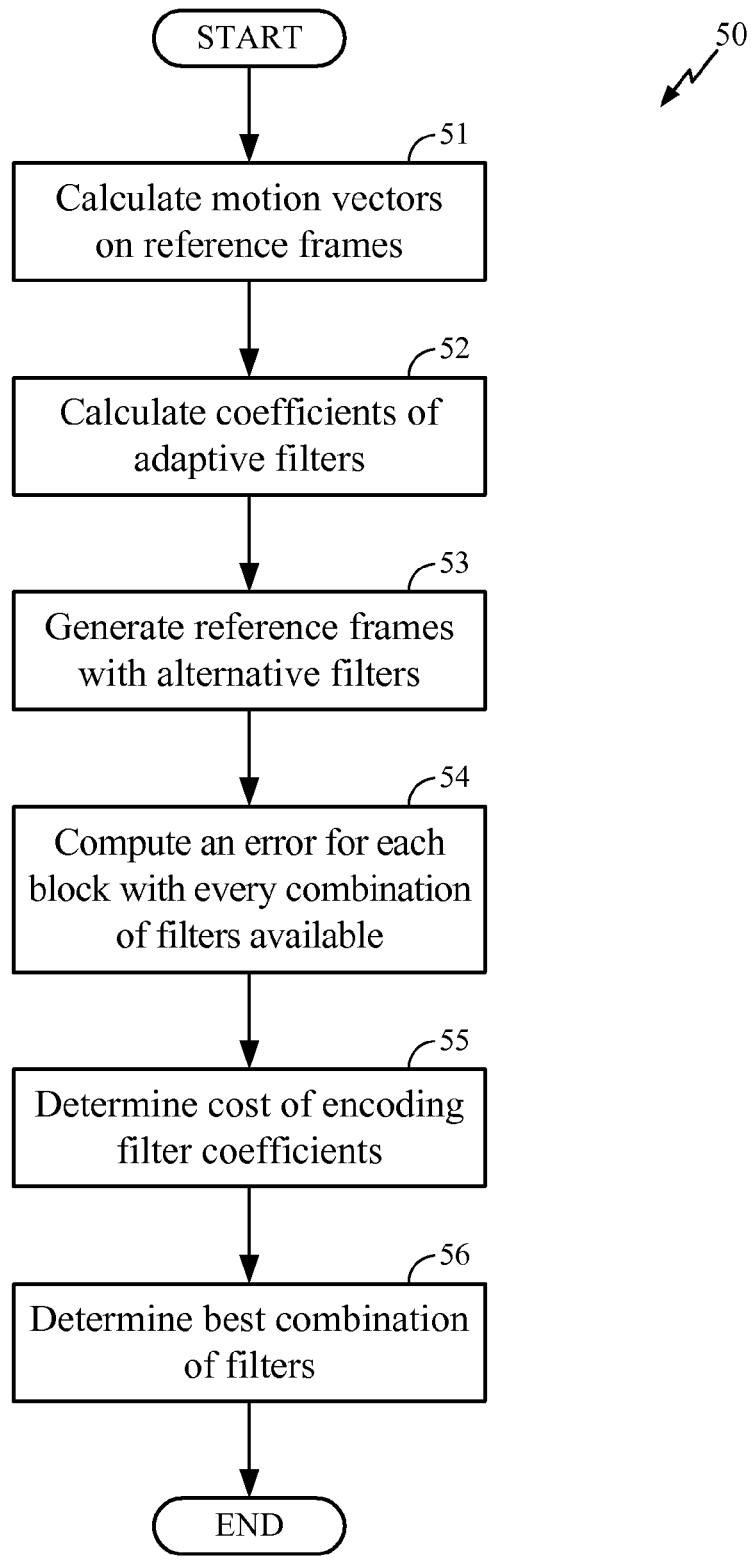
FIG. 4 is a flow diagram describing the process of determining best combination of filters.

FIG. 4 depicts an illustrative process 50 for determining a best combination of filters using the system shown in FIG. 3. The process begins at block 51 with the video encoder 20 calculating motion vectors of frames of reference to a current frame. The reference frames may be an intra-frame or predicted frames. The current frame 30 may be a bi-directional predicted frame. In one embodiment, a current frame references a previous intra-frame and a limited search using block matching is applied to calculate a motion vector describing the previous displacement. In another embodiment, a current frame references a future predicted frame and a limited search using block matching is applied to calculate a motion vector describing the predicted displacement. After motion vector data is calculated, it is transmitted to the filter decision unit 44 as described in FIG. 3.

The process 50 then moves to block 52 and calculating coefficients of alternative filters. In one embodiment, an adaptive interpolation filter is selected and coefficients, typically two vectors comprising a coefficient vector and an offset vector are sent. For example, a coefficient vector comprising six coefficients may be [1, 0, 1, 0, 1, 1], and corresponding offset vector [−1, 0, 2, 1, 3, 0]. One offset value is sent for each sub-pixel position, plus one offset for the full pixel position. So, there may be two vectors, one for the filter selection, and another, having same dimension, for the offsets. In another embodiment, a set of fixed, pre-calculated filters are used instead of determining adaptively the coefficients for each frame.

The process 50 then moves to block 53 and reference frames using alternative filters are generated. In one embodiment, a reference frame using an enhanced adaptive interpolation filter is generated and stored in the reference frame store 25. The reference frame may be interpolated using an adaptive interpolation filter, an enhanced adaptive interpolation filter, or a combination of non-default filters.

The process 50 then moves to block 54 and computing an error for each block with every combination of filters available. In one embodiment, a current frame 30 is compared with an interpolated reference frame using an alternative interpolation filter and the rate and distortion error is determined. In another embodiment, a current frame 30 is compared with an interpolated reference frame using a default H.264 filter, and the rate and distortion error is determined.

The process 50 then moves to block 55 and determining a cost of encoding filters coefficients. In one embodiment, a filter decision unit 44 of FIG. 3 determines a cost for each sub pixel position of encoding filter coefficients using a default interpolation filter verses using an alternative interpolation filter, wherein the cost is determined in bit overhead.

If some positions are considered symmetric, a single filter can be determined and chosen from more than one sub-pixel position. For example, sub-pixel position 'a' and 'c' could use filters that are mirror images of the other.

The process 50 then moves to block 56 and determines a best combination of filters. In one embodiment, for each full and sub pixel position in the final frame, a determination is made as to whether to use a default filter or an alternative filter based on the filter having a lower error and a low distortion rate when compared.

The mathematical computations used to determine the distortion rate per pixel are described below.

$SAD_{Std}$, the sum of absolute differences of the motion-compensated prediction error based on the default interpolation filter is calculated;

$SAD_{AIF}$, the motion-compensated prediction error based on the alternative interpolation filters is calculated;

$\lambda \cdot nBits$, the cost (in bit) of the side information necessary to encode the filters coefficients is calculated, multiplied by a scaling factor lambda and added to $SAD_{AIF}$;

Finally, $SAD_{Std}$ and $SAD_{AIF}+\lambda \cdot nBits$ are compared and the lowest value used to determine whether the alternative or the default interpolation filters should be used.

In one embodiment, if the filter selection uses predetermined and pre-calculated filters, and the encoder receives only the information related to the filter selection. For example, using the iterative method that finds a cost that is a local minimum approximation to the optimal cost, no side information, such as the cost (in bits) needs to be transmitted.

Figure 5:
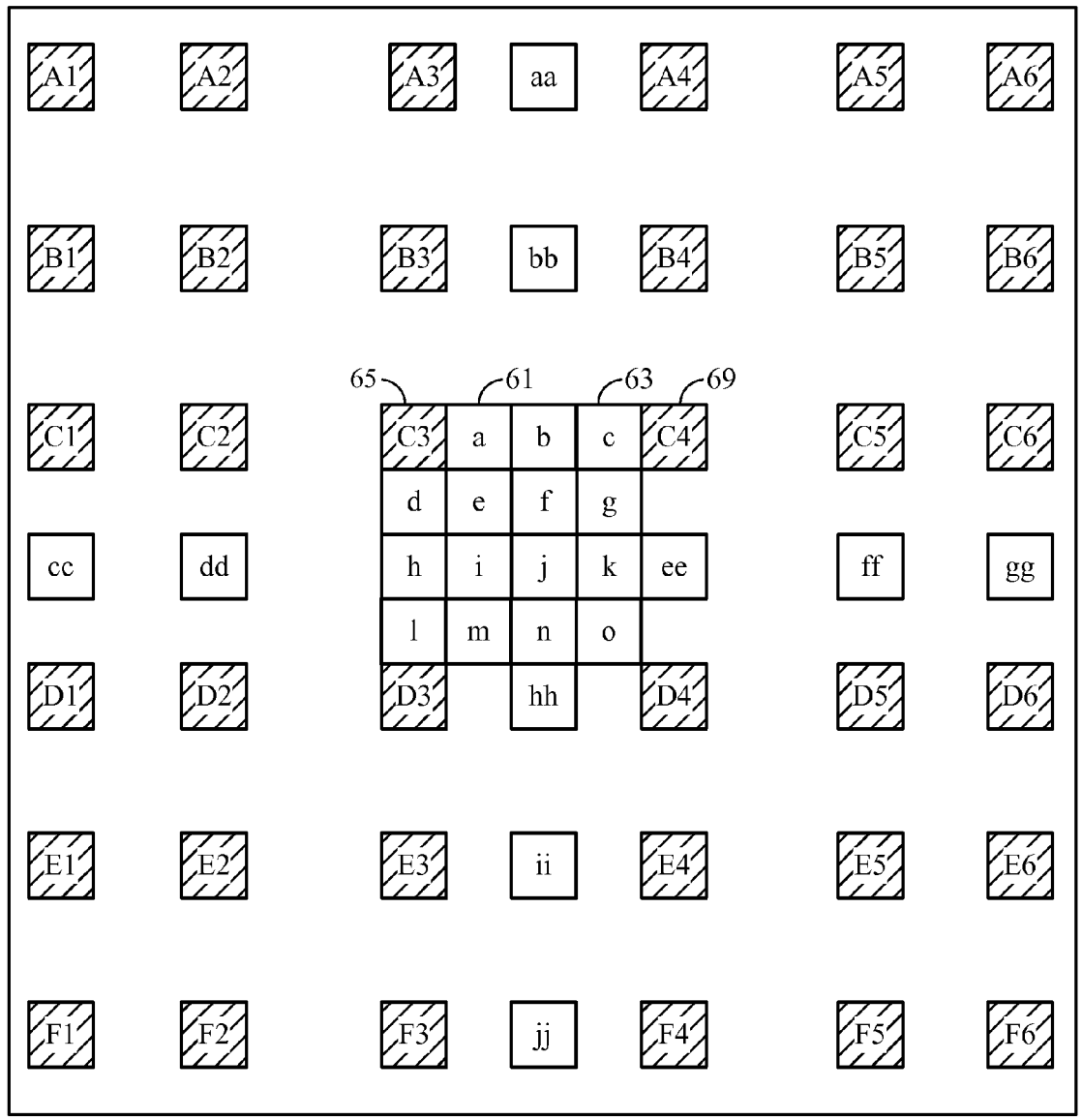
FIG. 5 is a block diagram of a video frame showing fractional pixel positions for interpolation.

FIG. 5 is a block diagram of a video frame showing fractional pixel positions for interpolation. Also, FIG. 5 illustrates a set of fractional pixel (or sub-pixel) positions in a video frames. In FIG. 5, there are altogether 15 sub-pixel positions, labeled "a" through "o" in FIG. 5. Moreover, this block diagram may be used to provide symmetry data and may lead to reduces computation overhead. For example, the ½-pixel positions 'a' 61 & 'c' 63, may be symmetric, reducing computational overhead involved in the interpolation processing. In yet another example, sub-pixel position 'C3' 65 may be symmetric to sub-pixel 'C4' 69 resulting in reduce computational overhead during interpolation processing.

A simplified heuristic method considers only error contributions in which the positions of the two reference blocks use the same filter. This happens when the positions are identical or when they belong to the same symmetry class (for example e, g, m and o in FIG. 5).

With this approach, it is possible to accumulate the error in a vector $C_{d_i,i}$ and the problem can be stated as:

$$\min_{D=(d_1,d_2,\ldots,d_n)} \sum_{i=1}^{n} (C_{d_i,i} + d_i \cdot \lambda \cdot nBits_i)$$

Due to the independence of the decisions, the solution can be found by minimizing each $d_i$ independently.

Figure 6:
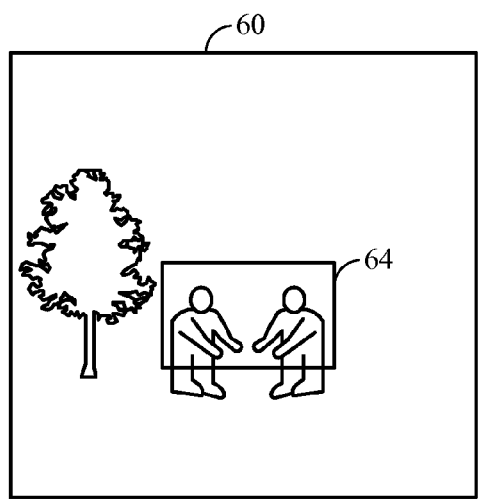
FIG. 6 is a block diagram illustrating video motion estimation.
Figure 6:
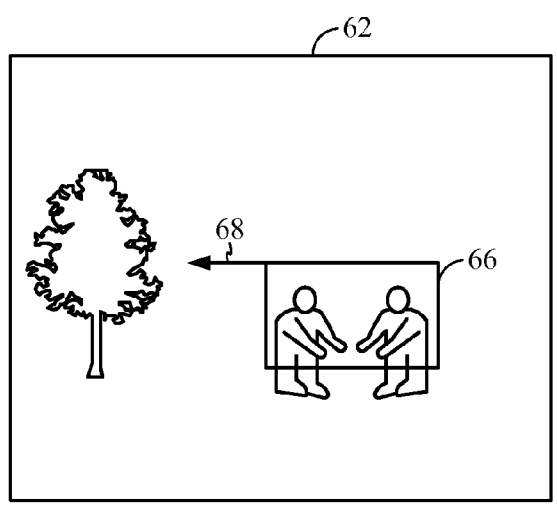

FIG. 6 is a block diagram illustrating motion estimation. In general, motion estimation is used to determine motion vectors for each macroblock in a current frame as compared to a reference frame. The process of calculating a motion vector comprises executing a search algorithm that determines a best match between a macroblock in the current frame and a block of pixels from a reference frame. The search algorithm is generally performed using a Sum of Absolute Difference (SAD) computation, which is well known in the art. In particular, the motion estimation compares each macroblock in the current frame with its surrounding area in the previous frame and attempts to find a match indicated by the minimum SAD.

Moreover, FIG. 6 illustrates a relationship between a sequential set of video frames. FIG. 6 depicts an intra-frame (or I-frame) 60 as a reference frame and a predicted frame (or P frame) 62 as a current frame. The predicted frame (P frame) 62 defining a first macroblock 66 and performing motion estimation by defining a second macroblock 64 in the Intra-frame 60 (or reference frame). The pixels within the first macroblock 66 and the second macroblock 64 are compared and the sum absolute difference (SAD) is calculated, and a motion vector 68 is determined as a result.

Figure 7:
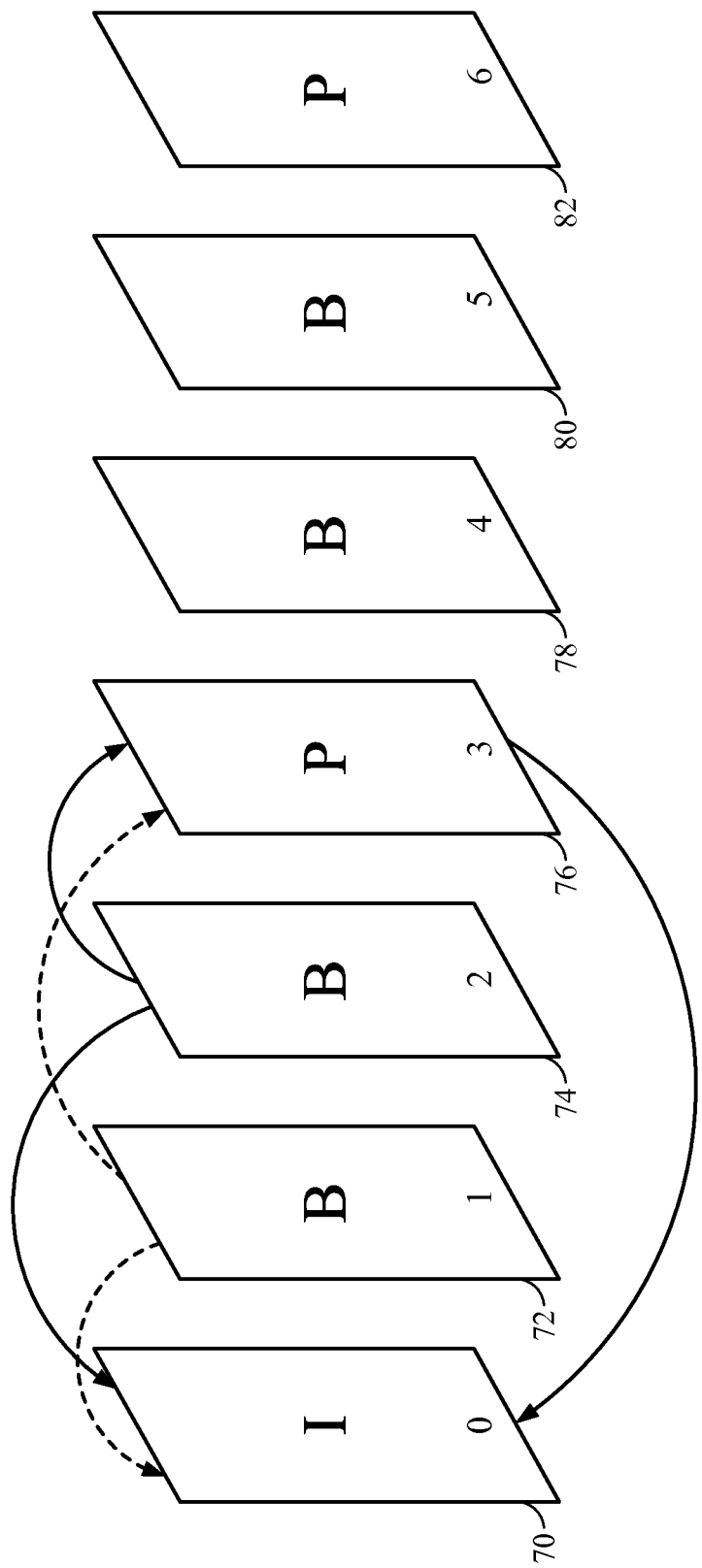
FIG. 7 is a block diagram illustrating a video frame including an intra frame, a predicted frame and a bi-directional frame.

FIG. 7 is a block diagram illustrating a video frame including an intra-frame, predicted frames, and bi-directional predicted frames. As illustrated, the intra-frame 70 does not reference any other frame, except itself. In one embodiment, an intra-frame is a first frame received in a sequence of frames. Generally, intra-frames do not reference any preceding frames and do not have the capability to reference frames in the future. On the other hand, predicted frames may reference previous intra-frames or future predicted frames. As shown in the diagram, the first predicted-frame 76 references the intra-frame 70 and does not reference the first B frame 72 or the second B frame 74. B frames, typically reference either intra-frames or predicted frames, both in the past and in the future. As shown in FIG. 7, a first B frame 72 references both the first intra-frame 70 and the first predicted frame 76 to determine the best motion vector. As shown in FIG. 7, a second B frame 74 references both a first intra-frame 70 and a first predicted frame 76.

Figure 8:
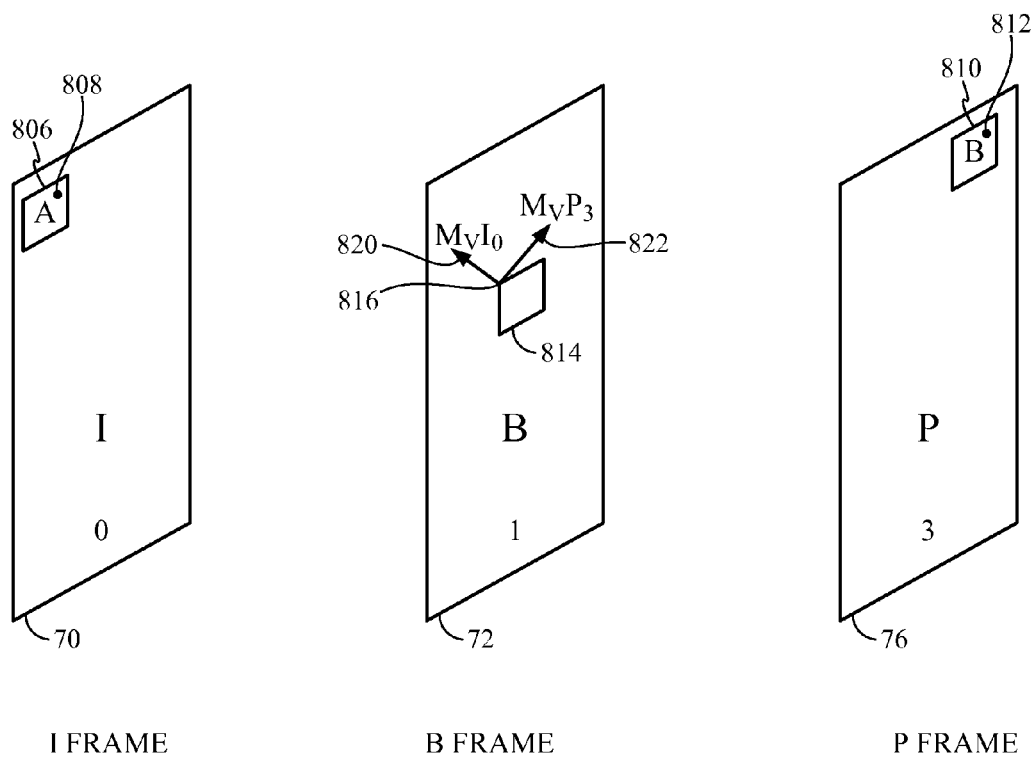
FIG. 8 is block diagram illustrating a video frame comprising a B slice comprising two motion vectors.

FIG. 8 is block diagram illustrating a video frame comprising a bi-directional predicted slice comprising two motion vectors. In one embodiment, a first bi-directional predicted frame 72 defining a first bi-directional predicted macroblock 814 having a size of 16×16 referencing an intra frame 70 (a preceding frame) defining a second intra-frame macroblock 806 having a size of 16×16 and a first predicted frame 76 (a future frame) defining a third predicted macroblock 810 having a size of 16×16. In another embodiment, the reference frames may also be two bi-directional predicted frames, two predicted frames, or a combination of a predicted frame and a bi-directional predicted frame. The first bi-directional predicted frame 72 calculating and identifying two motion vectors, a first intra motion vector 820 and a second predicted motion vector 822 as illustrated in FIG. 8. The intra frame 70 identifying a first intra-pixel 808 having the smallest sum of absolute difference value with reference with the first bi-directional predicted frame 72. As shown in FIG. 8, the first predicted frame 76 identifying a first predicted pixel 812 having the smallest sum of absolute difference value with reference with the first predicted frame 72.

Upon identification of a first intra pixel 808 and the first predicted pixel 812, a matrix is then constructed, as described below; wherein 'a' represents the first intra pixel 808 and 'b' represents the first predicted pixel 812.

matrix C=
0, 0, a, b
0, 1, a, b
1, 0, a, b
1, 1, a, b

Matrix C contains errors accumulated during the prediction, wherein 'a' and 'b' are sub-pixel positions. So, in FIG. 8, the first intra-motion vector 820 points to a sub-pixel position 'a' and the second predicted motion vector 822 points to a sub-pixel position 'b'. To matrix C=[0,0,a,b] the encoder will add the prediction error computed by applying default filters (choice 0) to both the first intra-pixel 808 and the first predicted pixel 812. To matrix C=[0,0,a,b] the encoder will be updated by adding the prediction error obtained by interpolating the first intra-pixel 808 with the adaptive filter and first predicted pixel 812 with the default filter (choice 1 0). To matrix C=[0,1,a,b] the encoder will add the prediction error obtained by interpolating the first intra-pixel 808 with a default filter and the first predicted pixel 812 with the adaptive filter (choice 0 1). Finally, to matrix C=[1,1,a,b] encoder will be updated with the prediction error obtained from the interpolation of both pixels with an adaptive filter (choice 1 1).

For each full and sub-pixel position, a decision vector $D=(d_1, d_2, \ldots, d_n)$ with $d_i \in \{0,1\}$ and $i=1, \ldots, n$ can be computed.

A filter flag of '1' or '0' for each sub-pixel position representing a unique set of filter coefficients sent to indicate whether a default or an alternative filter for the sub-pixel position is used. If the filter flag is set to '1', then the alternative filter coefficients for this sub-pixel position are predicted, quantized, coded and applied to corresponding sub-pixel positions. If the filter flag is set to '0', then the default interpolation filters are used to interpolate this sub-pixel position and its symmetric sub-pixel positions.

In the heuristic solution, using symmetry classes, an error is accumulated if both intra pixel 808 and predicted pixel 812 are pointing to the same sub-pixel position. For example, the matrix may be simplified to:

matrix=
0, 0, a, a
0, 1, a, a
1, 0, a, a
1, 1, a, a

In a bi-predicted block, the full or sub-pixel positions for the two reference blocks used in the prediction can be different, so the SAD error has to be collected for each combination of positions. It is possible to iterate through all blocks and, in a single pass, accumulate the absolute differences between the original and the interpolated pixels into a four-dimensional matrix where $C_{di,dj,i,j}$ represents the sum of absolute differences accumulated for the positions $i, j=1, \ldots, n$ when the filter decisions are $d_i, d_j \in \{0,1\}$.

For each block being encoded, the positions i and j refer to the second intra frame macroblock 806 (A) and the third predicted macroblock 810 (B). Then, for each pixel in the block 814, four predictions are computed by using pixStdX and pixAifX, the pixels interpolated with the default and with the alternative filters:

$pix\_00=(1-b\_scaling)*pixStdA+b\_scaling*pixStdB;$ $pix\_01=(1-b\_scaling)*pixStdA+b\_scaling*pixAifB;$ $pix\_10=(1-b\_scaling)*pixAifA+b\_scaling*pixStdB;$ $pix\_11=(1-b\_scaling)*pixAifA+b\_scaling*pixAifB;$ the reconstructed pixels are finally computed as:

$rec\_00=\max(0,\min(\max\_pixel\_value,(int)(pix\_00+0.5)));$ $rec\_01=\max(0,\min(\max\_pixel\_value,(int)(pix\_01+0.5)));$ $rec\_10=\max(0,\min(\max\_pixel\_value,(int)(pix\_10+0.5)));$ $rec\_11=\max(0,\min(\max\_pixel\_value,(int)(pix\_11+0.5)));$ and used to determine the absolute error corresponding to the use of the default or of the alternative interpolation filter. The error will be accumulated in the matrix as:

$C[0][0][i][j]+=(double)abs(orig-rec\_00);$ $C[1][1][i][j]+=(double)abs(orig-rec\_11);$ $C[0][1][i][j]+=(double)abs(orig-rec\_01);$ $C[1][0][i][j]+=(double)abs(orig-rec\_10);$ The scaling factor b-scaling can be either 0.5 or computed according to the sequence of the current and reference frames. This second method may be used to weight more the contributions of predictions originated from a temporally closer reference frame.

If one of the two reference blocks is missing, then the error contribution is only accumulated for one of the two positions. Furthermore, the error contributions to C[0][1] and C[1][0] are not accumulated when i=j and the position is the same for both reference blocks.

For each used alternative filter the filter coefficients may be explicitly signaled, so each position $i=1, \ldots, n$ (whether full- or sub-pixel) has an associated weighted cost $\lambda \cdot nBits_i$, with the weighting factor reflecting the contribution of the bits to the rate-distortion performance. If the filters are predetermined or pre-calculated and available to the encoder, then information, such as, cost (in bits) may not need to be transmitted.

With this formalism, the application consists of finding the binary decision vector $D=(d_1, d_2, \ldots, d_n)$ that minimizes:

$$\min_{D=(d_1,d_2,\ldots,d_n)} \sum_{i=1}^{n} \sum_{j=1}^{n} C_{d_i,d_j,i,j} + \sum_{i=1}^{n} d_i \cdot \lambda \cdot nBits_i$$

Given the matrix $C_{d_i,d_j,i,j}$ and the vector $\lambda \cdot nBits_i$, it is possible to exhaustively compute the error corresponding to each of the $2^n$ decision vectors and select the smallest.

An iterative method that closely approximates the optimal strategy includes starting from a possible solution (any valid decision vector) and finding the position for which an alternative filter has the largest error reduction. This position is then updated with the value of the new filter choice and the process is repeated until no more improvements are possible, the improvement is negligible (below a predetermined threshold) or a maximum number of iterations is reached. The three stopping criteria may be combined together.

A pseudo-code description of the method is as follows:

```
D[0,...,n-1] = {0, 0, 0, ..., 0};      //A starting solution
SAD = ComputeSAD(D, C);                // C is the cost matrix
while(stopping criteria are not satisfied)
{ (P, F) = FindPosition(D, C, SAD); // Find position and filter
                                       // decreasing SAD the most
  D[P] = F;                            // Update D
  SAD = ComputeSAD(D, C);              // Update SAD }
```

This method is able to converge to a local minimum in 8 to 10 iterations in many cases. If n is the number of positions and k is the number of choices (filters) available for each position, each iteration has $n \cdot (k-1)$ possibilities (the remaining k−1 filters on each of the n positions). If we limit the maximum number of iterations to be at most c, this method will have a computational complexity that is linear in the number of positions and filters.

A method of using uneven quantization, that is, the quantization precision, depends on the coefficient location. It has been found that for coefficients with smaller magnitude (these are coefficients farther away from the center of the filter), better precision is needed compared to coefficients with larger magnitude (these are coefficients closer to the center of the filter).

The matrix $Q^{FP}$ is used to specify the quantization precision of the coefficients of the integer-pixel filter. The numbers of bits in the matrix includes 1 bit for sign so, for example, the center coefficient will be quantized with 9 bits of which 1 used for the sign and 8 bits for the error magnitude.

$$Q^{FP} = \begin{bmatrix} 11 & 11 & 11 & 11 & 11 \\ 11 & 10 & 10 & 10 & 11 \\ 11 & 10 & 9 & 10 & 11 \\ 11 & 10 & 10 & 10 & 11 \\ 11 & 11 & 11 & 11 & 11 \end{bmatrix}$$

It has been found experimentally that $Q^{FP}$ provides the best quantization for P-frames, while B-frames are better encoded by using the finer quantization described by $\hat{Q}^{FP}$:

$$\hat{Q}^{FP} = \begin{bmatrix} 12 & 12 & 12 & 12 & 12 \\ 12 & 11 & 11 & 11 & 12 \\ 12 & 11 & 10 & 11 & 12 \\ 12 & 11 & 11 & 11 & 12 \\ 12 & 12 & 12 & 12 & 12 \end{bmatrix}$$

Figure 9:
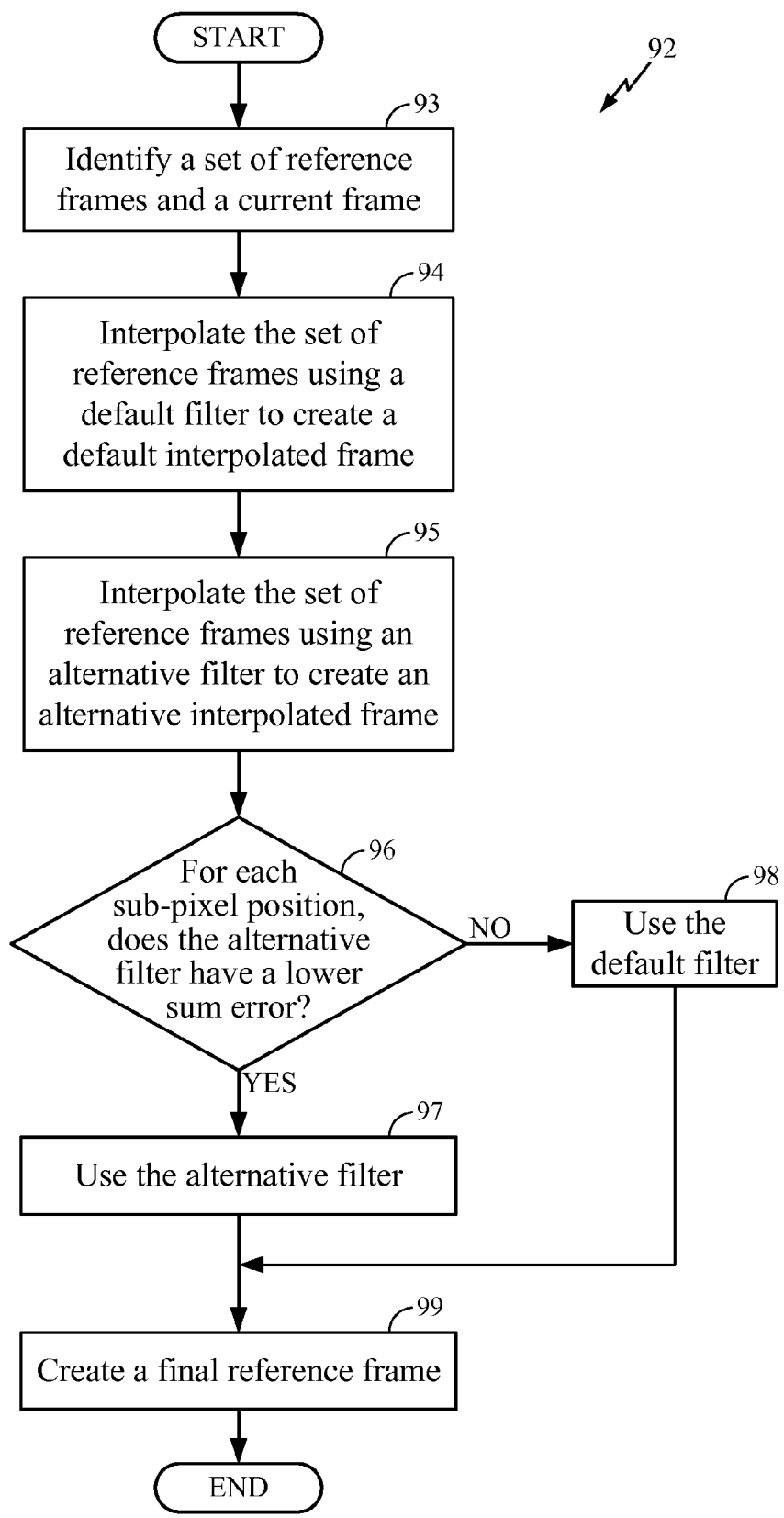
FIG. 9 is a flow diagram describing the process of creating a final reference frame.

FIG. 9 is a flow diagram describing a process 92 for creating a final reference frame based on filter selection decisions using the system shown in FIG. 3. The process begins at block 93 by identifying a set of reference frames and a current frame. For example, the set of reference frames stored in the reference frame store 25 and the current frame transmitted to the motion compensation unit 27 within the video encoder 26. In one embodiment, the set of reference frames comprise an intra-frame and predicted frames.

The process 92 then moves to block 94 and interpolates the set of reference frames using a default filter to create a default interpolated frame. The set of reference frames in the reference frame store 25 previously identified, may be interpolated using a default filter and transmitted to the reference frame store 25 for storage and later retrieval. The default filter may be any default filter (i.e. H.264 filter) resident within a video encoder 20 that is declared to be normative by a standards organization. In one embodiment, the set of reference frames are interpolated using a default H.264 filter and stored in the reference frame store 25 within the video encoder 26.

The process 92 then moves to block 95 and interpolates the set of reference frames using an alternative filter to create an alternative interpolated frame. The set of reference frames in the reference frame store 25 previously identified, may be interpolated using an alternative filter and transmitted to the reference frame store 25 for storage and later retrieval. The alternative filter may reside within the motion compensation unit 27, or may reside in another component within the encoder. The alternative filter may be any adaptive filter (i.e. 2D adaptive interpolation filter, E-AIF, etc) resident within a video encoder 26. In other words, an alternative filter is any filter that is available in the video encoder 20 which is not labeled a default filter. In one embodiment, the set of reference frames are interpolated using an enhanced adaptive interpolation filter and stored in the reference frames store 25 within the video encoder 26.

The process 92 then moves to block 96 and comparing for each sub pixel position, if the interpolated reference frames using the default filter have a lower sum error than the interpolated reference frames using the alternative filter; wherein the lower sum error based on the lowest combination of error rate and distortion. The sub pixel position may be one half of a pixel, one quarter of a pixel, one eighth of a pixel, or any fractional value less than one. In one embodiment, a sub pixel position is determined to have a lower sum error using a default filter than an alternative filter after comparing both interpolated reference frames.

The process 92 then moves to block 97, wherein the alternative filter is selected if it has the lower sum error value. In one embodiment, for each sub pixel position to be generated in a final frame, an alternative filter is selected if the alternative filter (for example, an adaptive interpolation filter) is determined to have a lower error rate and distortion rate.

Otherwise, the process 92 moves to block 98 wherein the default filter is selected if the alternative filter did not have the lower sum error value. In one embodiment, for each sub pixel position to be generated in a final frame, a default filter is selected if the default filter is determined to have a lower error and distortion rate.

The process 92 then moves to block 99 wherein for each sub pixel position, the best combination of either a default or an alternative filter is selected to generate a final reference frame. In one embodiment, the final reference frame is generated using only a default filter for each sub pixel position. In another embodiment, the final reference frame is generated using alternative filters, determined to have a lower sum error rate. In another embodiment, the final reference frame is generated using a combination of alternative and default filters determined to have a lower sum error rate per sub pixel position.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIG.s should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

The techniques described herein may be implemented in hardware, software, firmware, or any combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

The code associated with a computer-readable medium of a computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Various aspects have been described. These and other aspects are within the scope of the following claims.

What is claimed is:

1. A method of encoding digital video, the method comprising:
    identifying a reference frame and a current frame;
    interpolating blocks of the reference frame using a plurality of filters, wherein the interpolated blocks are used for predicting video blocks of the current frame,
    wherein the plurality of filters comprises one or more default filters and one or more alternative filters for each of a plurality of sub-pixel positions, wherein the one or more alternative filters comprise adaptive interpolation filters; and
    determining, for each of the plurality of sub-pixel positions of the interpolated blocks, whether to use one of the one or more default filters or one of the one or more alternative filters, based on a lower sum error to generate a block of a final frame,
    wherein determining whether to use the one of the one or more default filters or the one of the one or more alternative filters is implemented using a non-exhaustive solution that does not consider all possible combinations of the one or more default filters and the one or more alternative filters for each of the plurality of sub-pixel positions of the interpolated blocks.

2. The method of claim 1, wherein the reference frame is a predicted frame.

3. The method of claim 1, wherein the reference frame is a bi-directional predicted frame.

4. The method of claim 1, wherein at least one of the one or more default filters comprises a H.264 filter.

5. The method of claim 1, wherein the lower sum error is based on the lowest combination of error rate and distortion.

6. A video encoding device, comprising:
    a motion compensation unit configured to interpolate blocks of a reference frame using a plurality of filters, wherein the plurality of filters comprises one or more default filters and one or more alternative filters;
    a reference frame store configured to store the reference frame;
    a filter decision unit configured to:
        receive a current frame, and the reference frame;
        determine, for each of a plurality of sub-pixel positions of the interpolated blocks, whether to use one of the one or more default filters or one of the one or more alternative filters, based on a lower sum error, wherein the one or more alternative filters comprise adaptive interpolation filters; and
        generate a block of the final frame,
    wherein to determine whether to use the one of the one or more default filters or the one of the one or more alternative filters, the filter decision unit implements a non-exhaustive solution that does not consider all possible combinations of the one or more default filters and the one or more alternative filters for each of the plurality of sub-pixel positions of the interpolated blocks.

7. The video encoding device of claim 6, wherein at least part of one of the interpolated blocks is interpolated using a H.264 filter.

8. The video encoding device of claim 6, wherein the final frame is created using a combination of filters determined to have a low error rate and a low distortion rate.

9. The video encoding device of claim 6, wherein the sub-pixel position is a ½ pixel, a ¼ pixel, or ⅛ pixel.

10. The video encoding device of claim 6, wherein at least one of the one or more default filters is a H.264 filter.

11. A video encoding device, comprising:
    means for receiving a current frame and a reference frame;
    means for interpolating blocks of the reference frame using a plurality of filters,
    wherein the plurality of filters comprises one or more default filters and one or more alternative filters for each of a plurality of sub-pixel positions, wherein the one or more alternative filters comprise adaptive interpolation filters;
    means for producing blocks of a final frame; and
    means for determining for each of the plurality of sub-pixel positions of the interpolated blocks, whether to use one of the one or more default filters or one of the one or more alternative filters, based on a lower sum error to generate a block of the final frame,
    wherein to determine whether to use one of the one or more default filters or one of the one or more alternative filters for each full and sub pixel position in the final frame, the means for determining uses a non-exhaustive solution that does not consider all possible combinations of the one or more default filters and the one or more alternative filters for each of the plurality of sub-pixel positions of the interpolated blocks.

12. The video encoding device of claim 11, wherein at least part of the interpolated blocks is interpolated using a H.264 filter.

13. The video encoding device of claim 11, wherein the block of the frame is created using a combination of filters determined to have a low error rate and a low distortion rate.

14. The video encoding device of claim 11, wherein the sub-pixel position is a ½ pixel, a ¼ pixel, or ⅛ pixel.

15. The video encoding device of claim 11, wherein at least one of the one or more default filters is a H.264 filter.

16. A non-transitory computer readable storage medium comprising instructions to cause a processor to:
   identify a reference frame and a current frame;
   interpolate blocks using a plurality of filters, wherein the interpolated blocks are used for predicting video blocks of the current frame,
   wherein the plurality of filters comprises one or more default filters and one or more alternative filters for each of a plurality of sub-pixel positions, wherein the one or more alternative filters comprise adaptive interpolation filters; and
   determine, for each of the plurality of sub-pixel positions of the interpolated blocks, whether to use one of the one or more default filters or one of the one or more alternative filters based on a lower sum error to generate a block of a final frame,
   wherein the instructions that cause the processor to determine whether to use the one of the one or more default filters or the one of the one or more alternative filters use a non-exhaustive solution that does not consider all possible combinations of the one or more default filters and the one or more alternative filters for each of the plurality of sub-pixel positions of the interpolated blocks.

17. The method of claim 16, wherein the reference frame is an intra-frame.

18. The method of claim 16, wherein the reference frame is a predicted frame.

19. The method of claim 16, wherein at least one of the one or more default filters is a H.264 default filter.

20. The method of claim 16, wherein the lower sum error is based on the lowest combination of error rate and distortion.

21. A video encoding device, comprising:
   a filter decision unit configured to receive a current frame, and a reference frame,
   a motion compensation unit configured to interpolate blocks of the reference frame using a plurality of filters, wherein the plurality of filters comprises one or more default filters and one or more alternative filters for each of a plurality of sub-pixel positions, wherein the one or more alternative filters comprise adaptive interpolation filters,
   wherein the filter decision unit is further configured to:
      determine, for each of the plurality of sub-pixel positions of the interpolated blocks, whether to use one of the one or more default filters or one of the one or more alternative filters, based on a lower sum error to generate a block of a final frame, and
      generate the block of the final frame,
      wherein to determine whether to use the one of the one or more default filters or the one of the one or more alternative filters, the filter decision unit uses a non-exhaustive solution that does not consider all possible combinations of the one or more default filters and the one or more alternative filters for each of the plurality of sub-pixel positions of the interpolated blocks.

22. The video encoding device of claim 21, wherein the alternative filter is one of a plurality of pre-calculated filters.

23. The video encoding device of claim 11, wherein at least one of the one or more alternative filters is one of a plurality of pre-calculated interpolation filters.

24. The method of claim 1, the method further comprising: quantizing full-pixels used as support for the one of the one or more adaptive interpolation filters with different levels of precision based on a distance of each the full-pixels from a center of the one of the one or more adaptive interpolation filters.

25. The method of claim 24, the method further comprising:
   quantizing full-pixels closer to the center of the one of the one or more adaptive interpolation filters with higher quantization precision relative to full-pixels further away from the center of the one of the one or more adaptive interpolation filters.

26. The method of claim 24, wherein the full-pixels used as support comprise five full-pixels by five full-pixels of support, the method further comprising:
   determining the quantization precision of full-pixels used as support for adaptive interpolation of inter-predictive P-frames based on the following matrix:

$$Q^{FP} = \begin{bmatrix} 11 & 11 & 11 & 11 & 11 \\ 11 & 10 & 10 & 10 & 11 \\ 11 & 10 & 9 & 10 & 11 \\ 11 & 10 & 10 & 10 & 11 \\ 11 & 11 & 11 & 11 & 11 \end{bmatrix}$$

and determining quantization precision of full-pixels used as support for adaptive interpolation of inter-predictive B-frames based on the following matrix:

$$\hat{Q}^{FP} = \begin{bmatrix} 12 & 12 & 12 & 12 & 12 \\ 12 & 11 & 11 & 11 & 12 \\ 12 & 11 & 10 & 11 & 12 \\ 12 & 11 & 11 & 11 & 12 \\ 12 & 12 & 12 & 12 & 12 \end{bmatrix}$$

wherein each value of the matrix indicates a number of bits of precision used to a quantize a corresponding full-pixel of support, and wherein one of the bits of precision is used to indicate sign information of the corresponding full-pixel.

27. The video encoding device of claim 6, wherein the filter decision unit is further configured to:
   quantize full-pixels used as support for the one of the one or more adaptive interpolation filters with different levels of precision based on a distance of each the full-pixels from a center of the one of the one or more adaptive interpolation filters.

28. The video encoding device of claim 27, wherein the filter decision unit is further configured to:
   quantize full-pixels closer to the center of the one of the one or more adaptive interpolation filters with higher quantization precision relative to full-pixels further away from the center of the one of the one or more adaptive interpolation filters.

29. The video encoding device of claim 27, wherein the full-pixels used as support comprise five full-pixels by five full-pixels of support, wherein the filter decision unit is further configured to:

determine the quantization precision of full-pixels used as support for adaptive interpolation of inter-predictive P-frames based on the following matrix:

$$Q^{FP} = \begin{bmatrix} 11 & 11 & 11 & 11 & 11 \\ 11 & 10 & 10 & 10 & 11 \\ 11 & 10 & 9 & 10 & 11 \\ 11 & 10 & 10 & 10 & 11 \\ 11 & 11 & 11 & 11 & 11 \end{bmatrix}$$

and determine quantization precision of full-pixels used as support for adaptive interpolation of inter-predictive B-frames based on the following matrix:

$$\hat{Q}^{FP} = \begin{bmatrix} 12 & 12 & 12 & 12 & 12 \\ 12 & 11 & 11 & 11 & 12 \\ 12 & 11 & 10 & 11 & 12 \\ 12 & 11 & 11 & 11 & 12 \\ 12 & 12 & 12 & 12 & 12 \end{bmatrix}$$

wherein each value of the matrix indicates a number of bits of precision used to a quantize a corresponding full-pixel of support, and wherein one of the bits of precision is used to indicate sign information of the corresponding full-pixel.

30. The video encoding device of claim 11, wherein the filter decision unit is further configure to:

quantize full-pixels used as support for the one of the one or more adaptive interpolation filters with different levels of precision based on a distance of each the full-pixels from a center of the one of the one or more adaptive interpolation filters.

31. The video encoding device of claim 30, wherein the means for interpolating unit is further configured to:

quantize full-pixels closer to the center of the one of the one or more adaptive interpolation filters with higher quantization precision relative to full-pixels further away from the center of the one of the one or more adaptive interpolation filters.

32. The video encoding device of claim 30, wherein the full-pixels used as support comprise five full-pixels by five full-pixels of support, wherein the means for interpolating is further configured to:

determine the quantization precision of full-pixels used as support for adaptive interpolation of inter-predictive P-frames based on the following matrix:

$$Q^{FP} = \begin{bmatrix} 11 & 11 & 11 & 11 & 11 \\ 11 & 10 & 10 & 10 & 11 \\ 11 & 10 & 9 & 10 & 11 \\ 11 & 10 & 10 & 10 & 11 \\ 11 & 11 & 11 & 11 & 11 \end{bmatrix}$$

and determine quantization precision of full-pixels used as support for adaptive interpolation of inter-predictive B-frames based on the following matrix:

$$\hat{Q}^{FP} = \begin{bmatrix} 12 & 12 & 12 & 12 & 12 \\ 12 & 11 & 11 & 11 & 12 \\ 12 & 11 & 10 & 11 & 12 \\ 12 & 11 & 11 & 11 & 12 \\ 12 & 12 & 12 & 12 & 12 \end{bmatrix}$$

wherein each value of the matrix indicates a number of bits of precision used to a quantize a corresponding full-pixel of support, and wherein one of the bits of precision is used to indicate sign information of the corresponding full-pixel.

33. The computer-readable medium of claim 16, wherein the computer-readable medium further comprises instructions that cause the processor to:

quantize full-pixels used as support for the one of the one or more adaptive interpolation filters with different levels of precision based on a distance of each the full-pixels from a center of one of the one or more adaptive interpolation filters.

34. The computer-readable medium of claim 33, wherein the medium further comprises instructions that cause the processor to:

quantize full-pixels closer to the center of the one of the one or more adaptive interpolation filters with higher quantization precision relative to full-pixels further away from the center of the one of the one or more adaptive interpolation filters.

35. The computer-readable medium of claim 33, wherein the full-pixels used as support comprise five full-pixels by five full-pixels of support, wherein the computer-readable medium further comprises instructions that cause the processor to:

determine the quantization precision of full-pixels used as support for adaptive interpolation of inter-predictive P-frames based on the following matrix:

$$Q^{FP} = \begin{bmatrix} 11 & 11 & 11 & 11 & 11 \\ 11 & 10 & 10 & 10 & 11 \\ 11 & 10 & 9 & 10 & 11 \\ 11 & 10 & 10 & 10 & 11 \\ 11 & 11 & 11 & 11 & 11 \end{bmatrix}$$

and determine quantization precision of full-pixels used as support for adaptive interpolation of inter-predictive B-frames based on the following matrix:

$$\hat{Q}^{FP} = \begin{bmatrix} 12 & 12 & 12 & 12 & 12 \\ 12 & 11 & 11 & 11 & 12 \\ 12 & 11 & 10 & 11 & 12 \\ 12 & 11 & 11 & 11 & 12 \\ 12 & 12 & 12 & 12 & 12 \end{bmatrix}$$

wherein each value of the matrix indicates a number of bits of precision used to a quantize a corresponding full-pixel of support, and wherein one of the bits of precision is used to indicate sign information of the corresponding full-pixel.

36. The method of claim 1, wherein the non-exhaustive solution comprises:
identifying a valid binary decision vector as a previous solution vector if the previous solution vector is undefined, wherein each bit of a plurality of bits of the previous solution vector indicates whether to use one of the one or more default filters or one of the one or more alternative filters to interpolate at least one of a plurality of sub-pixel positions of one of the interpolated blocks;
determining a bit of the previous solution vector to change, wherein determining the bit of the previous solution vector includes determining which bit of the plurality of bits of the previous solution vector to change based on a calculation of which change results in a largest reduction of a sum of absolute differences between one of the interpolated blocks and a corresponding block of the current frame.

37. The method of claim 36, further comprising:
iteratively performing the method until no improvement in error reduction is possible or until the improvement is below a predetermined threshold.

38. The method of claim 36, the method further comprising:
performing the method until a maximum number of iterations is reached.

39. The video encoding device of claim 6, wherein the non-exhaustive solution comprises:
identifying a valid binary decision vector as a previous solution vector if the previous solution vector is undefined, wherein each bit of a plurality of bits of the previous solution vector indicates whether to use one of the one or more default filters or one of the one or more alternative filters to interpolate at least one of a plurality of sub-pixel positions of one of the interpolated blocks;
determining a bit of the previous solution vector to change, wherein determining the bit of the previous solution vector includes determining which bit of the plurality of bits of the previous solution vector to change based on a calculation of which change results in a largest reduction of a sum of absolute differences between one of the interpolated blocks and a corresponding block of the current frame.

40. The video encoding device of claim 39, further comprising:
iteratively performing the method until no improvement in error reduction is possible or until the improvement is below a predetermined threshold.

41. The video encoding device of claim 39, the method further comprising:
performing the method until a maximum number of iterations is reached.

42. The video encoding device of claim 11, wherein the non-exhaustive solution comprises:
identifying a valid binary decision vector as a previous solution vector if the previous solution vector is undefined, wherein each bit of a plurality of bits of the previous solution vector indicates whether to use one of the one or more default filters or one of the one or more alternative filters to interpolate at least one of a plurality of sub-pixel positions of one of the interpolated blocks;
determining a bit of the previous solution vector to change, wherein determining the bit of the previous solution vector includes determining which bit of the plurality of bits of the previous solution vector to change based on a calculation of which change results in a largest reduction of a sum of absolute differences between one of the interpolated blocks and a corresponding block of the current frame.

43. The method of claim 42, further comprising:
iteratively performing the method until no improvement in error reduction is possible or until the improvement is below a predetermined threshold.

44. The method of claim 42, the method further comprising:
performing the method until a maximum number of iterations is reached.

45. The computer-readable medium of claim 16, wherein the non-exhaustive solution comprises instructions that cause the processor to:
identify a valid binary decision vector as a previous solution vector if the previous solution vector is undefined, wherein each bit of a plurality of bits of the previous solution vector indicates whether to use one of the one or more default filters or one of the one or more alternative filters to interpolate at least one of a plurality of sub-pixel positions of one of the interpolated blocks;
determine a bit of the previous solution vector to change, wherein the instructions that cause the processor to determine the bit of the previous solution vector cause the processor to determine which bit of the plurality of bits of the previous solution vector to change based on a calculation of which change results in a largest reduction of a sum of absolute differences between one of the interpolated blocks and a corresponding block of the current frame.

46. The computer readable medium of claim 45, wherein the medium further comprises instructions that cause the processor to:
iteratively perform the method until no improvement in error reduction is possible or until the improvement is below a predetermined threshold.

47. The computer readable medium of claim 45, wherein the medium further comprises instructions that cause the processor to:
perform the method until a maximum number of iterations is reached.

48. The video encoding device of claim 21, wherein the non-exhaustive solution comprises:
identifying a valid binary decision vector as a previous solution vector if the previous solution vector is undefined, wherein each bit of a plurality of bits of the previous solution vector indicates whether to use one of the one or more default filters or one of the one or more alternative filters to interpolate at least one of a plurality of sub-pixel positions of one of the interpolated blocks;
determining a bit of the previous solution vector to change, wherein determining the bit of the previous solution vector includes determining which bit of the plurality of bits of the previous solution vector to change based on a calculation of which change results in a largest reduction of a sum of absolute differences between one of the interpolated blocks and a corresponding block of the current frame.

49. The video encoding device of claim 48, wherein the filter decision unit is further configured to:
iteratively perform the non-exhaustive solution until no improvement in error reduction is possible or until the improvement is below a predetermined threshold.

50. The video encoding device of claim 48, wherein the filter decision unit is further configured to:
perform the non-exhaustive solution until a maximum number of iterations is reached.

51. The method of claim 1, wherein the non-exhaustive solution comprises:
  determining a binary decision vector comprising a plurality of bits,
    wherein each of the plurality of bits of the binary decision vector indicates whether to use one of the one or more default filters or one of the one or more alternative filters to interpolate at least one of the plurality of sub-pixel positions of one of the interpolated blocks;
  calculating an error value associated with each possible bit value of the binary decision vector for each of the at least one of the plurality of sub-pixel positions; and
  independently minimizing an error function associated with each of the plurality of bits of the binary decision vector to determine whether to use one of the one or more default filters or one of the one or more alternative filters for each of the at least one of the plurality of sub-pixel positions, wherein the error function comprises a combination of a sum of absolute differences between the generated block and a corresponding block of the current frame, and a cost function indicative of a bit cost of the determined one of the one or more default filters or one of the one or more alternative filters.

52. The method of claim 51, wherein minimizing the error function comprises:

$$\min_{D=(d_1,d_2,\ldots,d_n)} \sum_{i=1}^{n} (C_{d_i,i} + d_i \cdot \lambda \cdot nBits_i).$$

wherein D comprises the binary decision vector,
  wherein "n" comprises a number of bits in the decision vector,
  wherein i comprises a current index of the decision vector, i =1, . . . ,n.
  wherein $d_1, \ldots, d_n$ comprise the bits of the binary decision vector that indicate whether to use one of the one or more default filters or one of the one or more alternative filters,
  wherein $C_{d_i,i}$ comprise a sum of absolute differences accumulated for the positions i =1,...,n, and
  wherein λ·nBits comprises a cost in bits of side information necessary to encode the determined one of the one or more default filters or one of the one or more alternative filters, multiplied by a scaling factor lambda.

53. The video encoding device of claim 6, wherein the non-exhaustive solution comprises:
  determining a binary decision vector comprising a plurality of bits,
    wherein each of the plurality of bits of the binary decision vector indicates whether to use one of the one or more default filters or one of the one or more alternative filters to interpolate at least one of the plurality of sub-pixel positions of one of the interpolated blocks;
  calculating an error value associated with each possible bit value of the binary decision vector for each of the at least one of the plurality of sub-pixel positions; and
  independently minimizing an error function associated with each of the plurality of bits of the binary decision vector to determine whether to use one of the one or more default filters or one of the one or more alternative filters for each of the at least one of the plurality of sub-pixel positions, wherein the error function comprises a combination of a sum of absolute differences between the generated block and a corresponding block of the current frame, and a cost function indicative of a bit cost of the determined one of the one or more default filters or one of the one or more alternative filters.

54. The video encoding device of claim 53, wherein minimizing the error function comprises:

$$\min_{D=(d_1,d_2,\ldots,d_n)} \sum_{i=1}^{n} (C_{d_i,i} + d_i \cdot \lambda \cdot nBits_i).$$

wherein D comprises the binary decision vector,
  wherein "n" comprises a number of bits in the decision vector,
  wherein i comprises a current index of the decision vector, i =1, . . . ,n.
  wherein $d_1, \ldots, d_n$ comprise the bits of the binary decision vector that indicate whether to use one of the one or more default filters or one of the one or more alternative filters,
  wherein $C_{d_i,i}$ comprise a sum of absolute differences accumulated for the positions i =1, . . . ,n, and
  wherein λ·nBits comprises a cost in bits of side information necessary to encode the determined one of the one or more default filters or one of the one or more alternative filters, multiplied by a scaling factor lambda.

55. The video encoding device of claim 11, wherein the non-exhaustive solution comprises:
  determining a binary decision vector comprising a plurality of bits,
    wherein each of the plurality of bits of the binary decision vector indicates whether to use one of the one or more default filters or one of the one or more alternative filters to interpolate at least one of the plurality of sub-pixel positions of one of the interpolated blocks;
  calculating an error value associated with each possible bit value of the binary decision vector for each of the at least one of the plurality of sub-pixel positions; and
  independently minimizing an error function associated with each of the plurality of bits of the binary decision vector to determine whether to use one of the one or more default filters or one of the one or more alternative filters for each of the at least one of the plurality of sub-pixel positions, wherein the error function comprises a combination of a sum of absolute differences between the generated block and a corresponding block of the current frame, and a cost function indicative of a bit cost of the determined one of the one or more default filters or one of the one or more alternative filters.

56. The video encoding device of claim 55, wherein minimizing the error function comprises:

$$\min_{D=(d_1,d_2,\ldots,d_n)} \sum_{i=1}^{n} (C_{d_i,i} + d_i \cdot \lambda \cdot nBits_i).$$

wherein D comprises the binary decision vector,
  wherein "n" comprises a number of bits in the decision vector,
  wherein i comprises a current index of the decision vector, i =1, . . . ,n.
  wherein $d_1, \ldots, d_n$ comprise the bits of the binary decision vector that indicate whether t use one of the one or more default filters or one of the one or more alternative filters,
  wherein $C_{d_i,i}$ comprise a sum of absolute differences accumulated for the positions i =1, . . . ,n, and
  wherein λ·nBits comprises a cost in bits of side information necessary to encode the determined one of the one or more default filters or one of the one or more alternative filters, multiplied by a scaling factor lambda.

57. The computer-readable medium of claim 16, wherein the non-exhaustive solution further comprises instructions that cause the processor to:
- determine a binary decision vector comprising a plurality of bits,
- wherein each of the plurality of bits of the binary decision vector indicates whether to use one of the one or more default filters or one of the one or more alternative filters to interpolate at least one of the plurality of sub-pixel positions of one of the interpolated blocks;
- calculate an error value associated with each possible bit value of the binary decision vector for each of the at least one of the plurality of sub-pixel positions; and
- independently minimize an error function associated with each of the plurality of bits of the binary decision vector to determine whether to use one of the one or more default filters or one of the one or more alternative filters for each of the at least one of the plurality of sub-pixel positions, wherein the error function comprises a combination of a sum of absolute differences between the generated block and a corresponding block of the current frame, and a cost function indicative of a bit cost of the determined one of the one or more default filters or one of the one or more alternative filters.

58. The computer-readable medium of claim 57, wherein minimizing the error function comprises:

$$\min_{D=(d_1,d_2,\ldots,d_n)} \sum_{i=1}^{n} (C_{d_i,i} + d_i \cdot \lambda \cdot nBits_i).$$

wherein D comprises the binary decision vector,
wherein "n" comprises a number of bits in the decision vector,
wherein i comprises a current index of the decision vector, i = 1, . . . ,n.
wherein $d_1, \ldots, d_n$ comprise the bits of the binary decision vector that indicate whether to use one of the one or more default filters or one of the one or more alternative filters,
wherein $C_{d_i,i}$ comprise a sum of absolute differences accumulated for the positions i = 1, . . . ,n, and
wherein λ·nBits comprises a cost in bits of side information necessary to encode the determined one of the one or more default filters or one of the one or more alternative filters, multiplied by a scaling factor lambda.

59. The video encoding device of claim 21, wherein the non-exhaustive solution comprises:
- determining a binary decision vector comprising a plurality of bits,
- wherein each of the plurality of bits of the binary decision vector indicates whether to use one of the one or more default filters or one of the one or more alternative filters to interpolate at least one of the plurality of sub-pixel positions of one of the interpolated blocks;
- calculating an error value associated with each possible bit value of the binary decision vector for each of the at least one of the plurality of sub-pixel positions; and
- independently minimizing an error function associated with each of the plurality of bits of the binary decision vector to determine whether to use one of the one or more default filters or one of the one or more alternative filters for each of the at least one of the plurality of sub-pixel positions, wherein the error function comprises a combination of a sum of absolute differences between the generated block and a corresponding block of the current frame, and a cost function indicative of a bit cost of the determined one of the one or more default filters or one of the one or more alternative filters.

60. The video encoding device of claim 59, wherein minimizing the error function comprises:

$$\min_{D=(d_1,d_2,\ldots,d_n)} \sum_{i=1}^{n} (C_{d_i,i} + d_i \cdot \lambda \cdot nBits_i).$$

wherein D comprises the binary decision vector,
wherein "n" comprises a number of bits in the decision vector,
wherein i comprises a current index of the decision vector, i = 1, . . . ,n.
wherein $d_1, \ldots, d_n$ comprise the bits of the binary decision vector that indicate whether to use one of the one or more default filters or one of the one or more alternative filters,
wherein $C_{d_i,i}$ comprise a sum of absolute differences accumulated for the positions i = 1, . . . ,n, and
wherein λ·nBits comprises a cost in bits of side information necessary to encode the determined one of the one or more default filters or one of the one or more alternative filters, multiplied by a scaling factor lambda.

\* \* \* \* \*